US012258250B2

(12) United States Patent
Morris

(10) Patent No.: US 12,258,250 B2
(45) **Date of Patent: *Mar. 25, 2025**

(54) MULTI-ARMED LIFTING ACCESSORY

(71) Applicant: Rockford Rigging, Inc., Rockford, IL (US)

(72) Inventor: John Morris, Chillicothe, IL (US)

(73) Assignee: ROCKFORD RIGGING, INC., Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,394

(22) Filed: Mar. 4, 2024

(65) Prior Publication Data

US 2024/0208784 A1 Jun. 27, 2024

Related U.S. Application Data

(63) Continuation-in-part of application No. 17/203,697, filed on Mar. 16, 2021, now abandoned, which is a continuation of application No. 16/595,174, filed on Oct. 7, 2019, now Pat. No. 10,947,096, which is a continuation of application No. 15/590,007, filed on May 8, 2017, now Pat. No. 10,435,281.

(60) Provisional application No. 63/449,917, filed on Mar. 3, 2023, provisional application No. 62/333,147, filed on May 6, 2016.

(51) Int. Cl.

| | |
|---|---|
| ***B66F 9/12*** | (2006.01) |
| ***E02F 3/04*** | (2006.01) |
| ***E02F 3/34*** | (2006.01) |
| *B66C 1/28* | (2006.01) |
| *B66F 9/00* | (2006.01) |
| *E02F 3/00* | (2006.01) |

(52) U.S. Cl.

CPC .................. *B66F 9/12* (2013.01); *E02F 3/04* (2013.01); *E02F 3/3402* (2013.01); *E02F 3/3414* (2013.01); *B66C 1/28* (2013.01); *B66F 9/00* (2013.01); *E02F 3/00* (2013.01)

(58) Field of Classification Search

CPC ...... B66F 9/00; B66F 9/12; E02F 3/00; E02F 3/3402; E02F 3/3414; E02F 3/04; B66C 1/0281; B66C 1/28; B66C 1/30

USPC ....................... 414/718; 294/67.1–67.5, 81.2

See application file for complete search history.

(56) References Cited

U.S. PATENT DOCUMENTS

| | | | | |
|---|---|---|---|---|
| 5,476,300 A | 12/1995 | Dodge | | |
| 8,764,082 B2 * | 7/2014 | Krogh | ...................... | B66C 1/42 294/93 |
| 9,434,580 B2 | 9/2016 | Bakalyar | | |
| 2006/0181096 A1 | 8/2006 | Gerhausser | | |

* cited by examiner

*Primary Examiner* — Ronald P Jarrett

(74) *Attorney, Agent, or Firm* — HAMILTON IP LAW, PC; Jay R. Hamilton

(57) ABSTRACT

A Multi-Armed Lifting Accessory is disclosed herein which is compact and transportable in various deployments. The Multi-Armed Lifting Accessory is advantageous and useful as it has hingedly connected loading and support arms attached to a main lifter body. The supporting arms are spring loaded allowing the Multi-Armed Lifting Accessory to stably engage with irregular shaped objects such as barge lid or a skid steer loader and allows for flexible engagement and balanced lifting operations.

16 Claims, 32 Drawing Sheets

MULTI-ARMED LIFTING ACCESSORY

CROSS REFERENCE TO RELATED APPLICATIONS

The present application claims priority in-part from pending utility non-provisional U.S. patent application Ser. No. 17/203,697 filed on Apr. 16, 2021 which claimed priority from utility non-provisional U.S. patent application Ser. No. 16/595,174 filed on Oct. 7, 2019 (issued as U.S. Pat. No. 10,947,096) which claimed priority from utility non-provisional U.S. patent application Ser. No. 15/590,007 filed on May 8, 2018 (issued as U.S. Patent No. 10,435,281) which claimed priority from utility provisional U.S. Pat. App. No. 62/333,147 filed on May 6, 2016, all of which are incorporated by reference herein in their entireties. The present application also claims priority U.S. Pat. App. No. 63/449,917 filed on Mar. 3, 2023, which is also incorporated by reference herein in its entirety.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX: NOT APPLICABLE

AUTHORIZATION PURSUANT TO 37 C.F.R. § 1.171 (d)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY OF DISCLOSURE

As disclosed, the transportable Multi-Armed Lifting Accessory is configured to engage with the bucket of a crane, loader or high-line for the purpose of securing a heavy, irregular load engaged with the arms of the Multi-Armed Lifting Accessory to improve the convenience and safety of moving heavy irregular shaped or balanced loads, such as a barge lid or skid steer loader tractor to, from and between a dock and a barge located proximate the dock. Designed to be compact and fit into the back of a pick-up for easy in transport and mobility. As disclosed herein, lids can be hooked and unhooked from deck level.

BRIEF DESCRIPTION OF THE DRAWINGS

The accompanying drawings, which are incorporated in and constitute a part of this specification, illustrate embodiments and together with the description, serve to explain and illustrate the principles of the Multi-Armed Lifting Accessory as disclosed herein.

DETAILED DESCRIPTION - TABLE OF ELEMENTS

Figure 1:
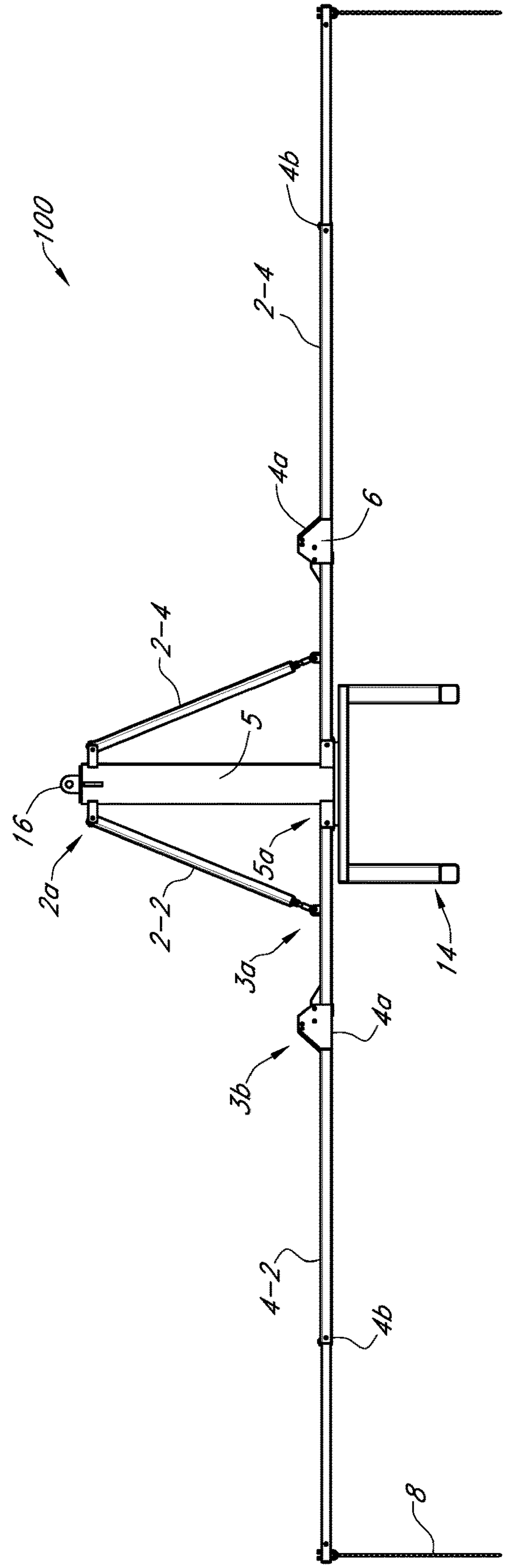
FIG. 1 is a side view of the Multi-Armed Lifting Accessory disclosed herein along with detailed call outs for enablement of the present disclosure.

| Element Description | Element Number |
|---|---|
| Spring tube | 1 |
| First end | 1a |
| Second end | 1b |
| Support arm | 2 |
| Support arms (FIG. 1A) | 2-1, 2-2, 2-3, 2-4 |
| First end of each Support Arm | 2a |
| Second end of each Support Arm | 2b |
| Loading Arm - first section | 3 |
| Loading Arms - first section (first, second, third and fourth) (FIG. 1A) | 3-1, 3-2, 3-3, 3-4 |
| First end | 3a |
| Second end | 3b |
| Loading Arm (second) | 4 |
| Loading Arms - second section (first, second, third and fourth) | 4-1, 4-2, 4-3, 4-4 |
| First end | 4a |
| Second end | 4b |
| Lifter body | 5 |
| Lower connection | 5a |
| Upper connection | 5b |
| Shoulder plate | 5c |
| T-connector | 5d |
| Joint (pivotable connection) | 6 |
| Pin | 7 |
| Chain (with hooks) | 8 |
| Connection - support arm to loading arm | 9 |
| Shoulder bolt | 12 |
| Chain (dog) | 13 |
| Lifter base | 14 |

-continued

DETAILED DESCRIPTION - TABLE OF ELEMENTS

| Element Description | Element Number |
|---|---|
| Horizontal leg | 14a |
| Horizontal leg- First | 14a-1 |
| Horizontal leg- Second | 14a-2 |
| Vertical leg | 14b |
| Eye | 16 |
| Working End (hook, cable, chain, loader bucket, gator, caterpillar excavator bucket) | 20 |
| Barge lid | 30 |
| Multi-Armed Lifting Accessory | 100 |

DETAILED DESCRIPTION

Before the present Multi-Armed Lifting Accessory 100 is disclosed and described, it is to be understood that the Multi-Armed Lifting Accessory 100 is not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used with at least one embodiment of the disclosed Multi-Armed Lifting Accessory 100. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all potential embodiments of the Multi-Armed Lifting Accessory 100. This applies to all aspects of this application including, but not limited to, components of a Multi-Armed Lifting Accessory 100. Thus, if there are a variety of additional components that can be added it is understood that each of these additional components can be added with any specific embodiment or combination of embodiments of the Multi-Armed Lifting Accessory 100. The present Multi-Armed Lifting Accessory 100 may be understood more readily by reference to the following detailed description of preferred embodiments and the examples included therein and to the Figures and their previous and following description.

FIG. 1 is a side view of the Multi-Armed Lifting Accessory 100 disclosed herein. As shown, the Multi-Armed Lifting Accessory 100 is comprised of a base stand 14 having a pair of legs at the bottom with a body 5 affixed to the top. The base stand 14 is configured to support the unit when in transport or prior to engagement with the working end 20 of a lifting device (not shown). As one of ordinary skill will appreciate, the working end 20 of a lifting device 21 is not limited by this disclosure and may be configured as a hook, a cable, a chain, a loader bucket, or an excavator bucket which can engage with the upper portion of the lifter body 5*b* in a configuration suitable for a particular application. (See FIGS. 4D, 5 and 6 for additional disclosure and discussion herein.) Further, as one of ordinary skill will appreciate, the lifting device 21 that does the work of lifting the Multi-Armed Lifting Accessory 100 may be a chain or cable from a hydraulic crane, a helicopter, or the bucket of an excavator or loader, any of which could be lifting device 21 and suitable for a particular application. A pair of loading arms forming a x-type pattern are attached to the bottom of the lifter body 5 at lower connection 5*a*. The first portion of the loading arms 3 extends horizontally away from the vertical lifter body 5. The second portion of the loading arms 4 can be extended either horizontally or vertically at a pivotable joint 6 positioned at the second end of the first portion of the loading arm 3. For transport, the second portions of both loading arms 4 are typically vertically positioned. (See FIG. 5 and the accompanying discussion herein) During use and loading/unloading, the second portions of the loading arms 4 are positioned horizontally. As shown, four support arms 2, each having a first and a second end (2*a*, 2*b*), respectively, are hingedly attached at a first end 2*a* to the top of the lifter body at the upper connection 5*b* and hingedly attached at a second end 2*b* to the first portion of each of the loading arms 3 at connection 9 having shoulder bolt 12 positioned therein allowing for pivot action. The location of connection 9 may vary but as shown and disclosed is typically at the midway point between the lifter body 5 and the joint 6 positioned at the second end 3*b* of the loading arm first section 3.

Figure 1A:
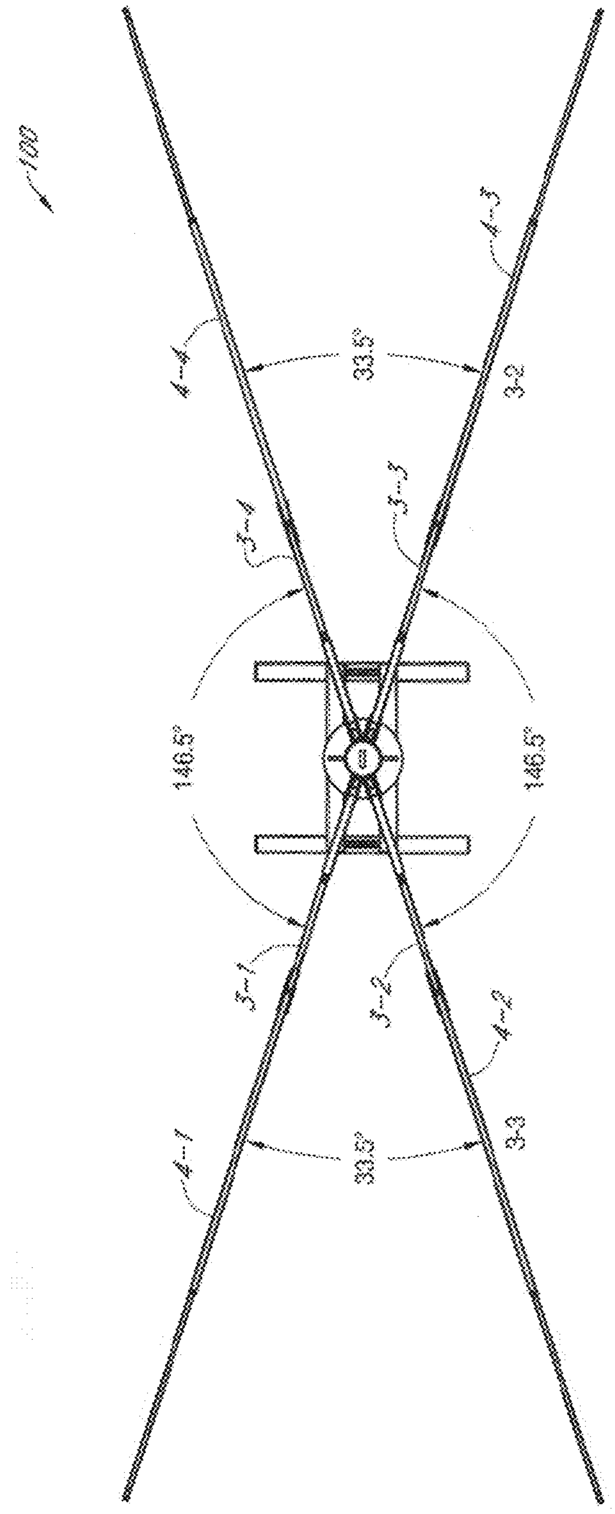
FIG. 1A is a top view of the Multi-Armed Lifting Accessory shown in FIG. 1 along with detailed call outs for enablement of the present disclosure.

FIG. 1A is a top view of the Multi-Armed Lifting Accessory 100 shown at FIG. 1 along with detailed call outs for enablement of the present disclosure. This view shows the x-like formation the pair of the loading arms 3 and 4 make in relation to the lifter body 5 and lifter base 14. The particular configuration of Multi-Armed Lifting Accessory 100 for use in lifting operations of irregular shaped or balanced loads comprises a lifter body 5 having an upper end and a lower end, the upper end configured for engagement with the working end 20 of a lifting device 21 (not shown), such as a chain (see FIG. 4D), cable (not shown), loader bucket or excavator bucket (not shown in FIG. 4B) and the lower end configured as a base allowing independent support of the lifter body 5. As shown the lifter base 14 is configured with horizontal legs 14*a* and vertical legs 14*b*, in one configuration, but could be configured in other configurations as required by a particular application. The horizontal legs 14*a* are further comprised of a first horizontal leg 14*a*-1 and a second horizontal leg 14*a*-2 wherein the first horizontal leg 14*a*-1 is positioned at a first end (top) of the vertical leg 14*b* and the second horizontal leg 14*a*-2 is positioned at a second end (bottom) of the vertical leg 14*b*. As shown in FIGS. 3A-4D, the first horizontal leg 14*a*-1 is positioned at an angle of approximately 90 degrees (perpendicular) with the second horizontal leg 14*a*-2 to provide a better support for the Multi-Armed Lifting Accessory 100. In another embodiment, dependent on a particular application, the first horizontal leg 14*a*-1 may be positioned at different angles (in the range of 0 to 360 degrees) with the second horizontal leg 14*a*-2, without any limitation and/or restriction unless otherwise indicated in the following claims. As shown, there is a first, second, third and fourth loading arm, first section (3-1, 3-2, 3-3, 3-4). As shown, the first end 3*a* of the loading arm attaches to the lifter body 5 at lower connection 5*a*. Each loading arm first section 3 also has a second end 3*b* which is connected to the second loading arm section 4 via joint 6 having a shoulder bolt 12 positioned therein. As shown, there is a first, second, third and fourth loading arm, first section (3-1, 3-2, 3-3, 3-4). Each loading arm second section 4 having a first end 4*a* and a second end 4*b*.

Further, the loading arm 3 has a first section 3 and second section 4 wherein each section has a first end (a) and a second end (b). The first end 3*a* of the first section of the loading arm is attached to the lifter body 5. The second end 3*b* of the first section of the loading arm is connected to the first end 4*a* of the second section of the loading arm 4. The second end 4*b* of the second section of the loading arm is designed for attachment of the chain 8 with hooks, subject to engaging and lifting purposes, without limitation and restriction. One of ordinary skill will appreciate that other types of chain 8 and fasteners including hooks, shoulder bolts 12, pins 7 and or pegs could be used for well-securing attachment of load or heavy object during transportation and for easy detachment or removal of load or heavy object when needed. Additionally, a pivot joint 6 is positioned between and connects the second end 3*b* of the first section to the first end 4*a* of the second section of the loading arm. One of ordinary skill will also appreciate that the pivot joint 6 allows the loading arm 4 to flex during loading of the second end 4*b* of the second section of the loading arm and allows for secure attachment to a load, without any limitation and restriction.

Another aspect of the embodiment, a support arm 2 is configured with a first end 2*a* and a second end 2*b* wherein the first end 2*a* of the support arm connects to the upper end 5*b* of the lifter body. The second end 2*b* of the support arm 2 attaches to the first section 3 of the loading arm at a position between the first end 3*a* and the second end 3*b* of the first section of the loading arm 3. One of ordinary skill will appreciate that multi-armed lifting accessory 100 is configured of multiple loading arms-first section (3-1, 3-2, 3-3, 3-4), loading arms-second section (4-1, 4-2, 4-3, 4-4), and support arms (2-1, 2-2, 2-3, 2-4) which provides balance, flexibility, and support for the device during lifting and transportation. Another benefit of having multiple loading arms is that multiple loading arms allows the multi-armed lifting accessory 100 to lift various size and irregular shape objects.

As shown in FIG. 1A, each loading arm (3, 4) lies in the horizontal plane. There is an angle of 33.5 degrees between the first loading arm (3-1, 4-1) and the second loading arm (3-2, 4-2). There is an angle of 146.5 degrees between the second loading arm (3-2, 4-2) and the third loading arm (3-3, 4-3). There is an angle of 33.5 degrees between the third loading arm (3-3, 4-3) and the fourth loading arm (3-4, 4-4). There is an angle of 146.5 degrees between the fourth loading arm (3-4, 4-4) and the first loading arm (3-1, 4-1). One of ordinary skill will appreciate that other angles and positions of each loading arm 3 in relation to the lifter body 5 may be used without any limitation and restriction, subject to the particular application of the Multi-Armed Lifting Accessory 100.

Figure 2A:
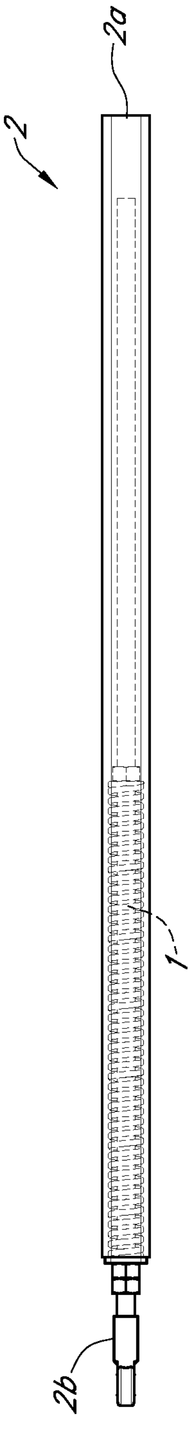
FIG. 2A is a side view of the arms of the Multi-Armed Lifting Accessory and spring tube as shown in FIG. 1.
Figure 2B:
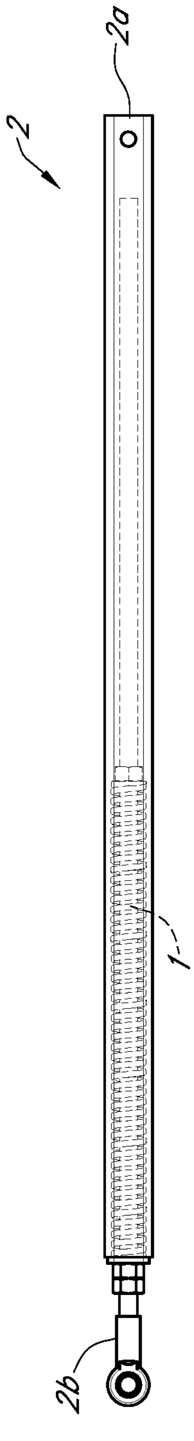
FIG. 2B is a top view of the arms of the Multi-Armed Lifting Accessory and spring tubes as shown in FIG. 2A.
Figure 2C:
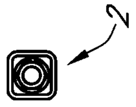
FIG. 2C is a cross section view of the support arm of the Multi-Armed Lifting Accessory as disclosed in FIG. 2A and FIG. 2B.

FIG. 2A is a side view of the arms 2 of the Multi-Armed Lifting Accessory 100 having spring tube 1 cooperatively engaged therein as shown at FIG. 1. FIG. 2B is a top view of the arms 2 of the Multi-Armed Lifting Accessory 100 and spring tubes 1 as shown at FIG. 2A. FIG. 2C is a cross section view of the support arm 2 of the Multi-Armed Lifting Accessory 100 as disclosed at FIG. 2A and FIG. 2B. As shown, the first end of the support arm 2*a* is configured with an aperture for pinned attachment and engagement to and with one of the pair of tabs 5*b* also having an aperture positioned therein, located at the upper end of the lifter body 5. A pin 7 is positioned therein to connect and secure the end of the support arm 2*a* to the lifter body 5.

Figure 4A:
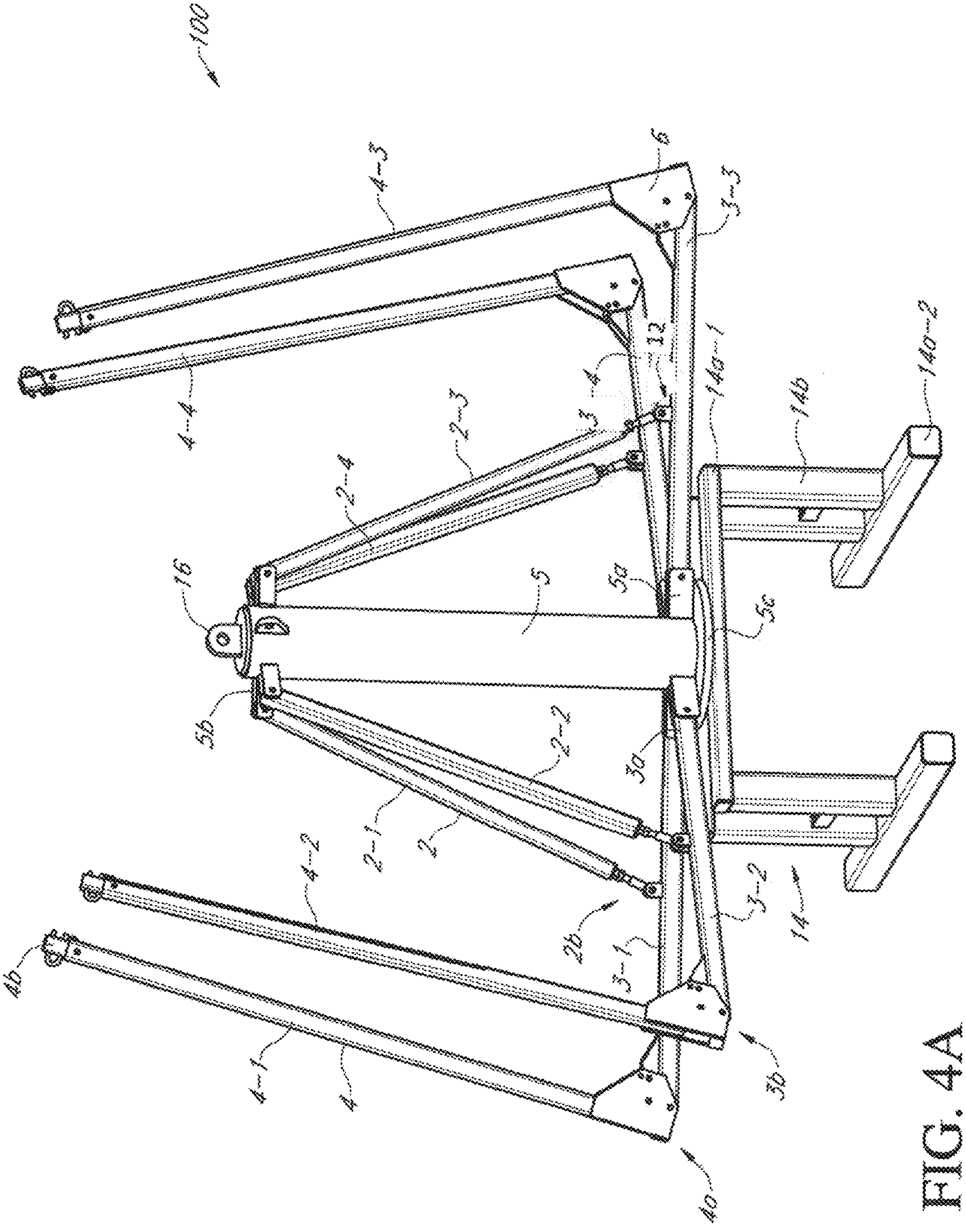
FIG. 4A is a perspective view of one embodiment of the Multi-Armed Lifting Accessory as shown throughout with the first loading arms and the second loading arms extend vertically therein.

One of ordinary skill will appreciate that support arm 2 could be connected to the upper portion of lifter body 5 through any number of securement devices allowing pivotable attachment, without limitation or restriction herein. As shown, the second end 2*b* of the support arm is also configured with an aperture for pinned attachment and engagement to and connection with a pair of tabs positioned on the first section 3 of the loading arm. As shown in FIGS. 2B and 4A, the second end 2*b* of the support arms are configured as a shoulder ball having an aperture therein for pinned pivotable attachment and securement to the first section of the loading arm 3, which are well known to those of ordinary skill in the arts.

One of ordinary skill will appreciate that the spring tubes 1 and support arms 2 work together to provide a flexing action in support of loading arms 3 and 4 thereby allowing the Multi-Armed Lifting Accessory to give as needed in response to the large, irregular shaped barge lids 30 which are prone to flexing thereby allowing firm but flexible engagement. One of ordinary skill will appreciate that the Multi-Armed Lifting Accessory 100 could be used with other odd or irregular shaped loads which may flex including building materials and or large sheets of fabric. (not shown) One of ordinary skill will appreciate that the Multi-Armed Lifting Accessory 100 could also be used with other odd or irregular balanced loads which may require the spring-loaded or tensioned flexing provided by the Multi-Armed Lifting Accessory 100 during a lifting operation from a first location to a second location, wherein the load must transverse a particular elevation change between a first location and a second location. Using the Multi-Armed Lifting Accessory with an excavator positioned on a dock to move a skid steer loader (not shown) from the dock to the hold of a barge located below the dock is but one example of a lifting operation which the Multi-Armed Lifting Accessory 100 could be used for.

Figure 3A:
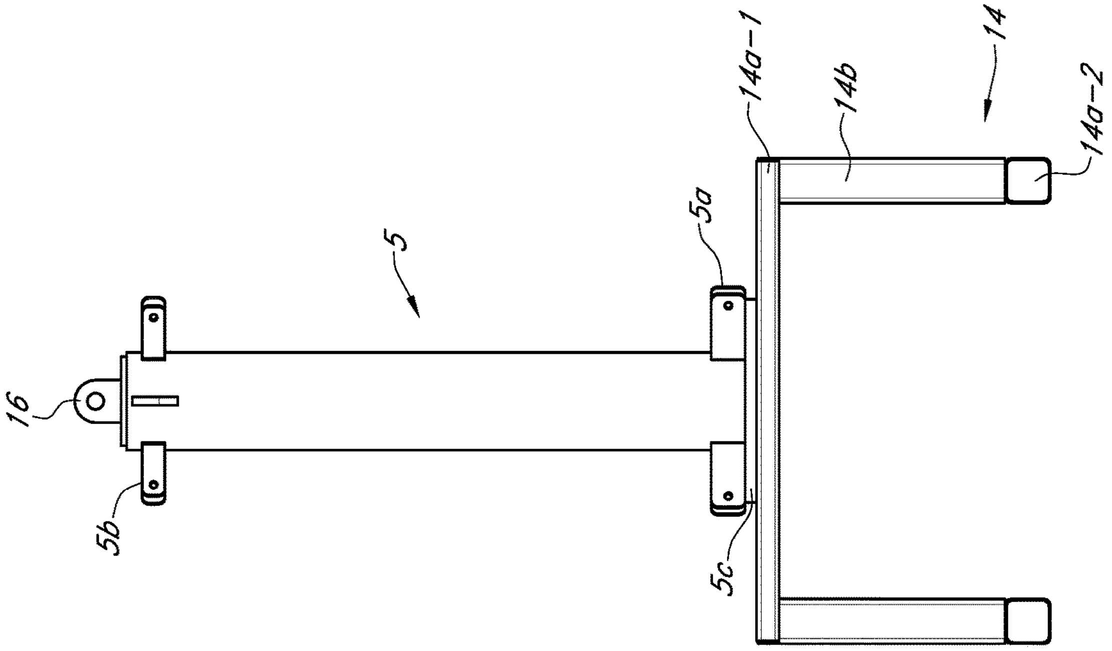
FIG. 3A is a side view of the lifter body of the Multi-Armed Lifting Accessory as disclosed in FIG. 1.
Figure 3B:
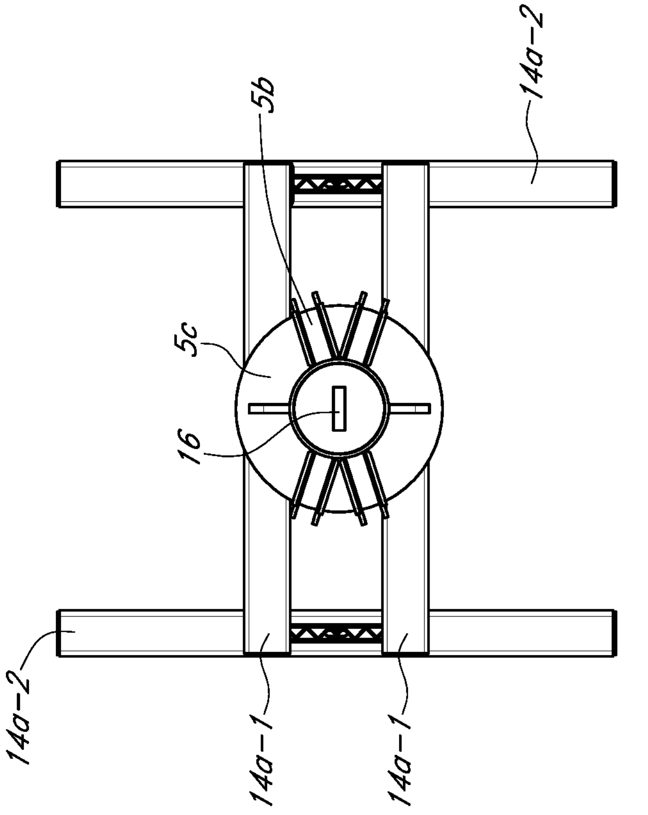
FIG. 3B is a top view of the lifter body of the Multi-Armed Lifting Accessory as disclosed in FIG. 1 and shown throughout.
Figure 3C:
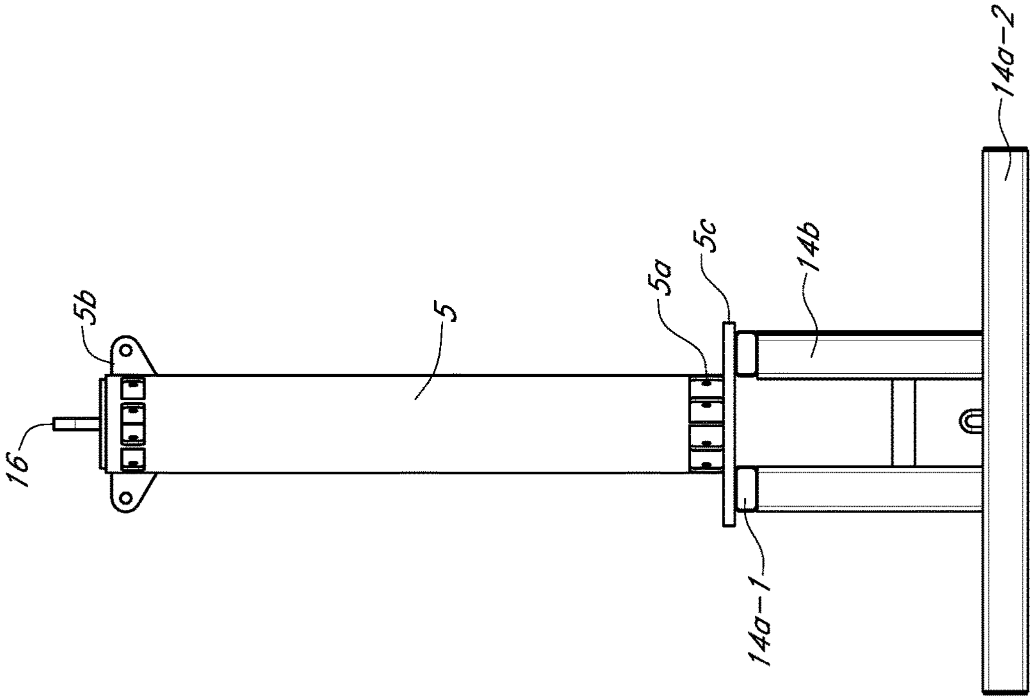
FIG. 3C is an end view of the lifter body of the Multi-Armed Lifting Accessory as disclosed in FIG. 1 and shown throughout.

FIG. 3B is a top view of the lifter body 5 of the Multi-Armed Lifting Accessory 100as disclosed at FIG. 1 and shown throughout including an angle call out (35.5 degrees) for the position of the arms (2,3). FIG. 3C is an end view of the lifter body 5 of the Multi-Armed Lifting Accessory 100 as disclosed at FIG. 1 and shown throughout.

FIG. 4A is a perspective view of one embodiment of the Multi-Armed Lifting Accessory 100 as shown throughout with the first loading arms 3 and the second loading arms 4 extend vertically therein.

Figure 4B:
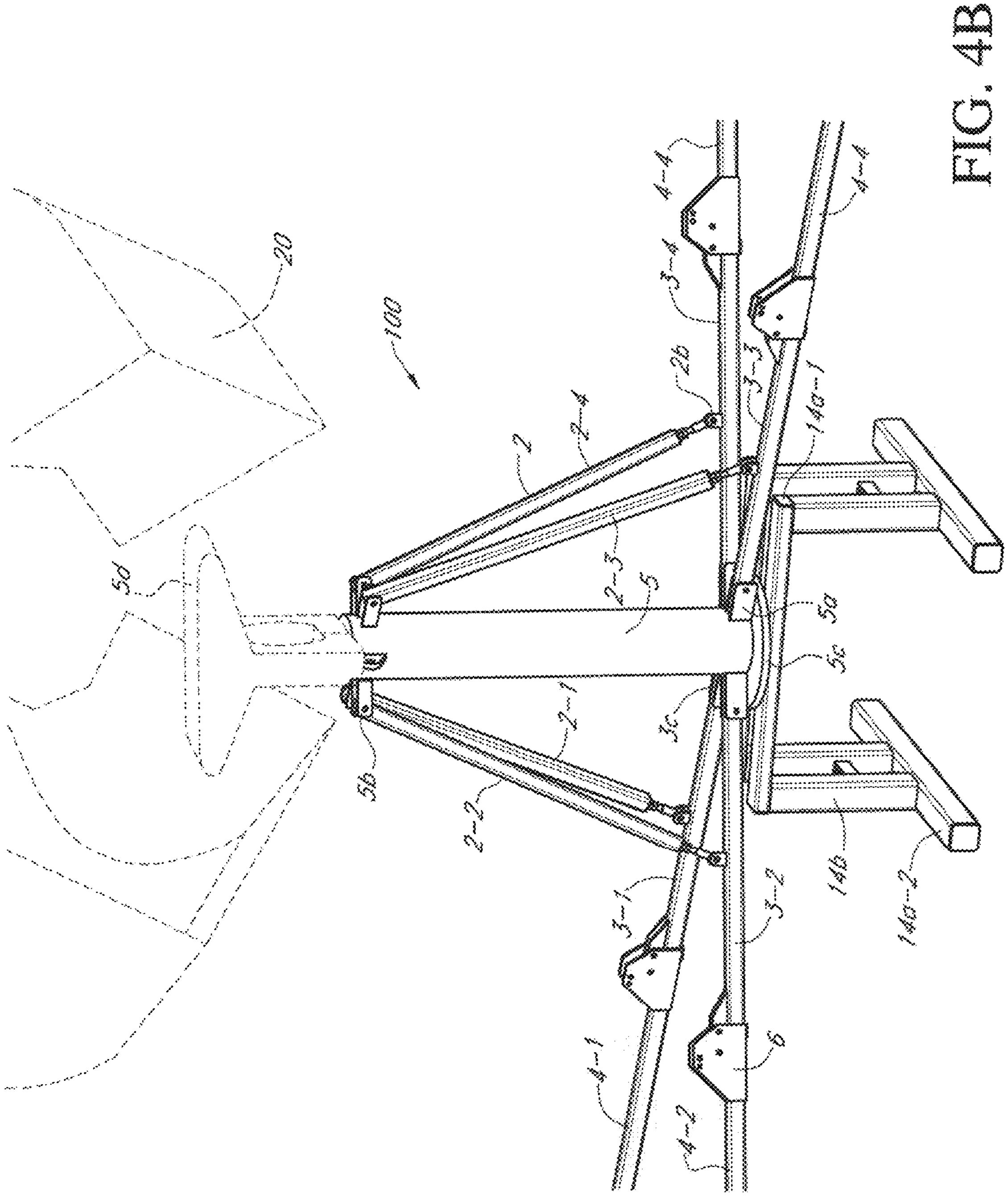
FIG. 4B is a perspective view of one embodiment of the Multi-Armed Lifting Accessory as shown throughout with the loading arms connects to the support arms via joint.

FIG. 4B is a perspective view of one embodiment of the Multi-Armed Lifting Accessory 100 as shown throughout with the loading arms 3 connects to the support arms 2 via joint 3*b*. Further, the upper portion of the lifter body is configured as a T-connector 5*d* (shown in hidden lines). The working end 20 of the lifting device (shown in hidden lines) is opened to grasp the T-connector 5*d*, as demonstrated in FIG. 4B. One of ordinary skill will appreciate that the upper portion of the lifter body may have other configurations, without limitation or restriction, subject to the particular application of the Multi-Armed Lifting Accessory 100 and the working end 20 used to engage the lifter body 5.

Figure 4C:
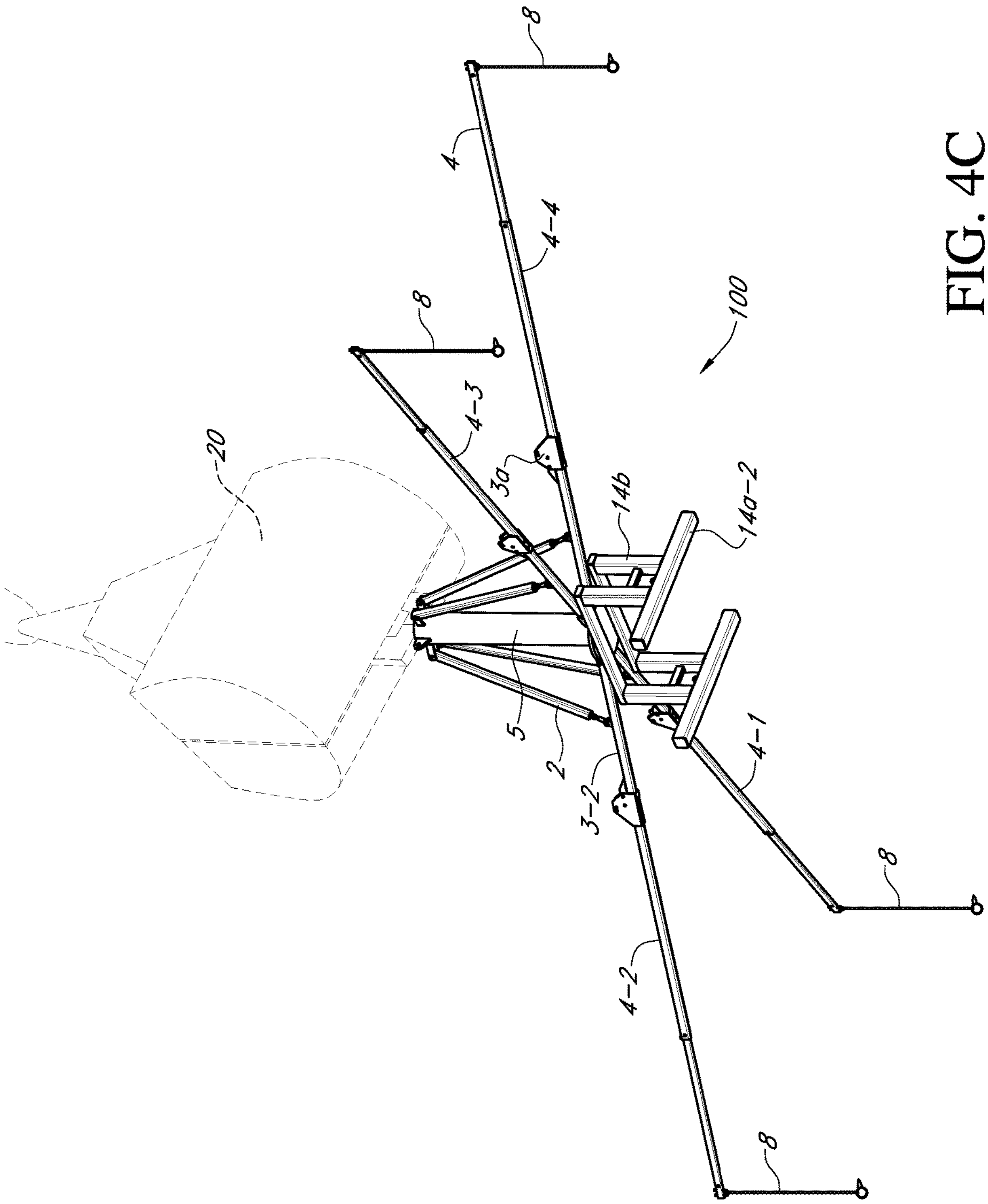
FIG. 4C is a perspective view of one embodiment of the Multi-Armed Lifting Accessory as shown throughout with the attachment of the chain.

FIG. 4C is a perspective view of one embodiment of the Multi-Armed Lifting Accessory 100 as shown throughout with the attachment of the chain 8 at the end of the lifting arm second section 4. The working end 20 (configured as a bucket) of the lifting device 21 (not shown) is closed for lifting close and lifted the multi-armed lifting accessory 100 up.

Figure 4D:
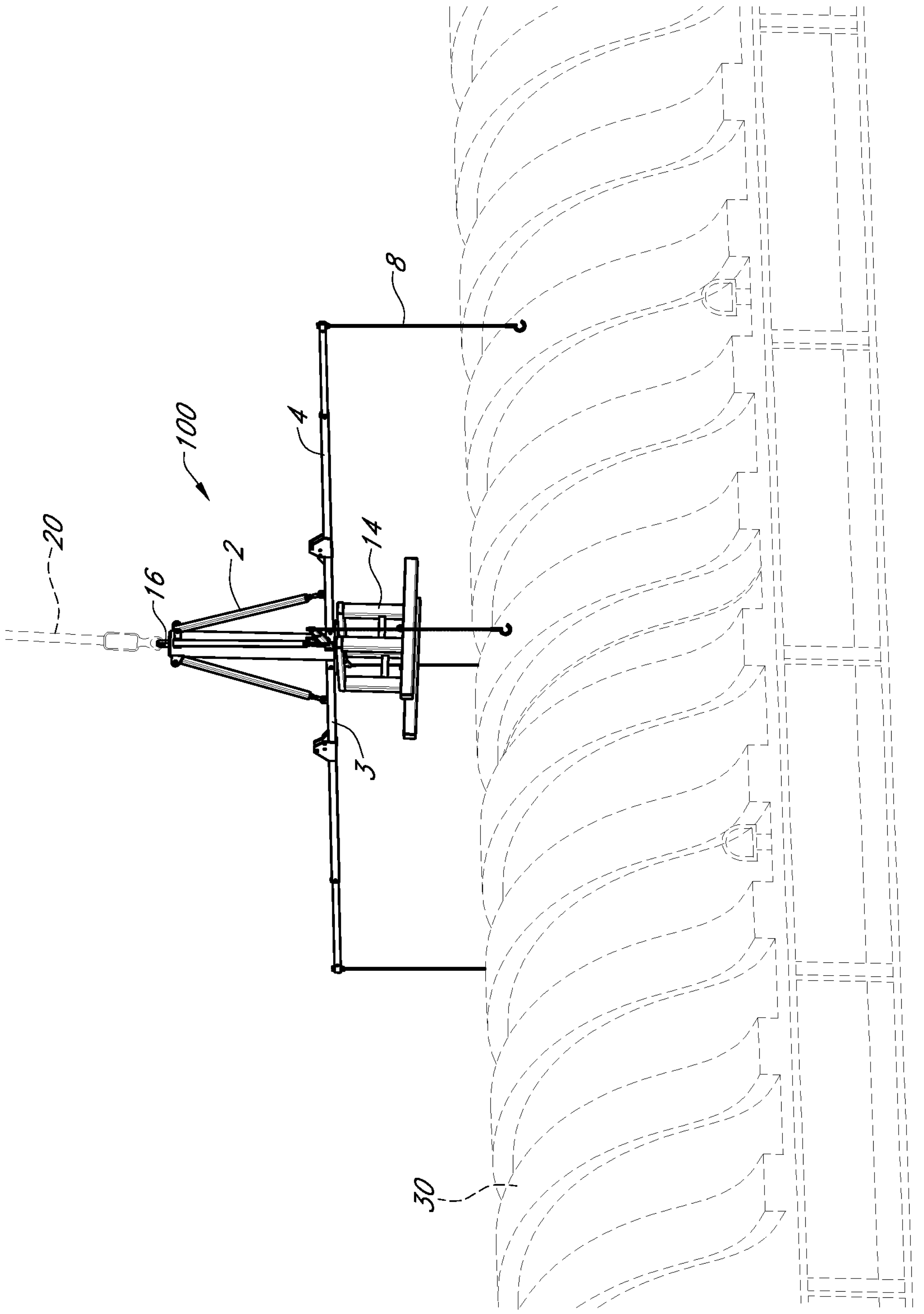
FIG. 4D is another perspective view of one embodiment of the Multi-Armed Lifting Accessory as shown throughout.

FIG. 4D is another perspective view of one embodiment of the Multi-Armed Lifting Accessory as shown throughout. The multi-armed lifting accessory 100 is lifting a barge lid 13 (shown in hidden lines) up. The upper portion of the lifter body is connected to a chain, without limitation and restriction.

Figure 5:
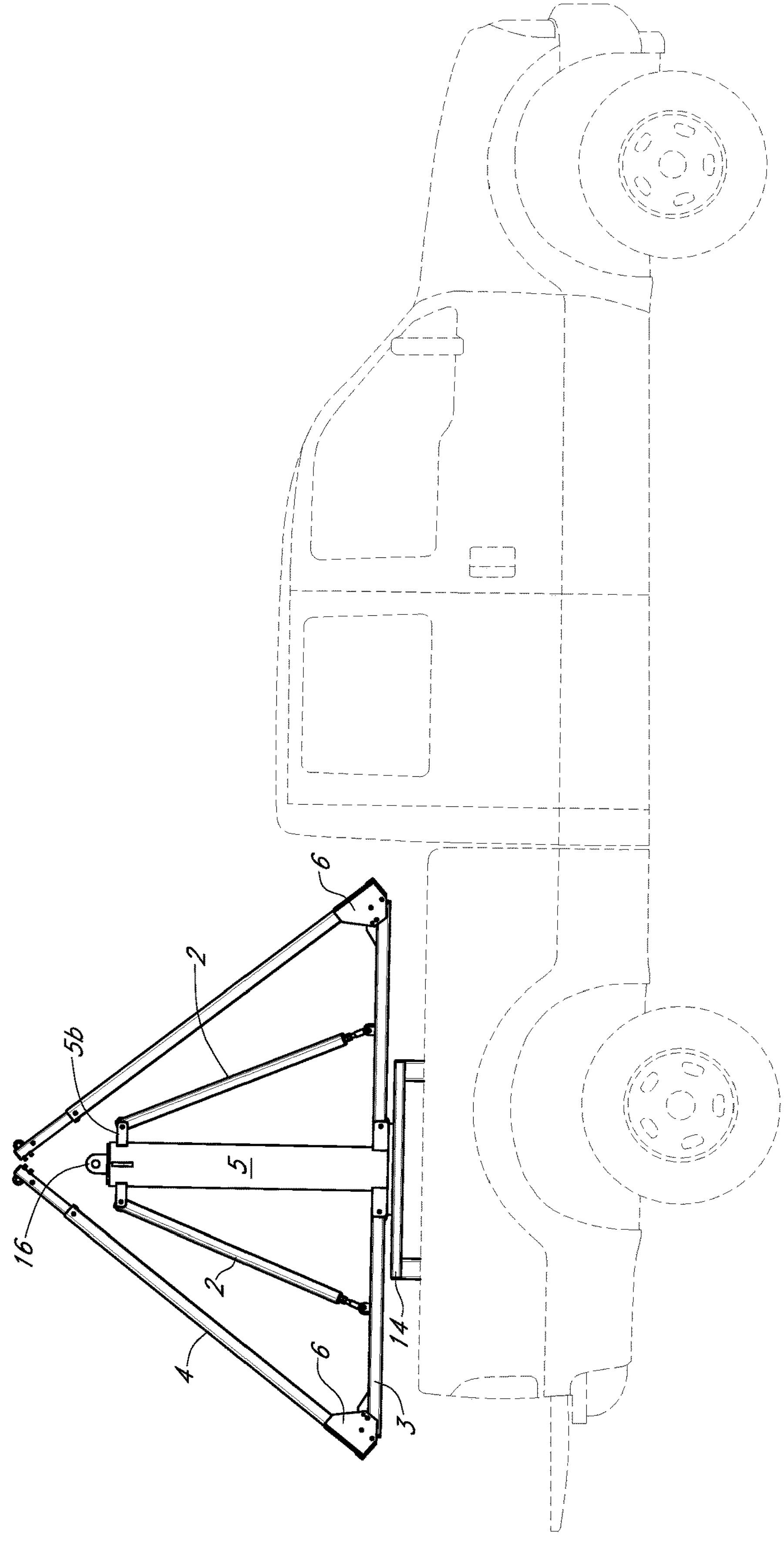
FIG. 5 is a perspective view of one embodiment of the Multi-Armed Lifting Accessory as shown throughout with the first loading arms and second loading arms positioned vertically wherein the end of each second loading arms meets each other at a point above the lifter body.

FIG. 5 is a perspective view of one embodiment of the Multi-Armed Lifting Accessory 100 as shown throughout with the first loading arms 3 and second loading arms 4 positioned vertically wherein the first end 4*a* of each second loading arms meets each other at a point above the lifter body 5. During transportation, the second loading arms 4 could be folded vertically which give the embodiment a tidy appearance, saved space and easy for transportation. With the unique structure, the multi-armed lifting accessory 100, when folded, conveniently fits into a truck (shown in hidden lines), SUV, UTV, or even in a loader bucket without taking too much space.

Figure 6:
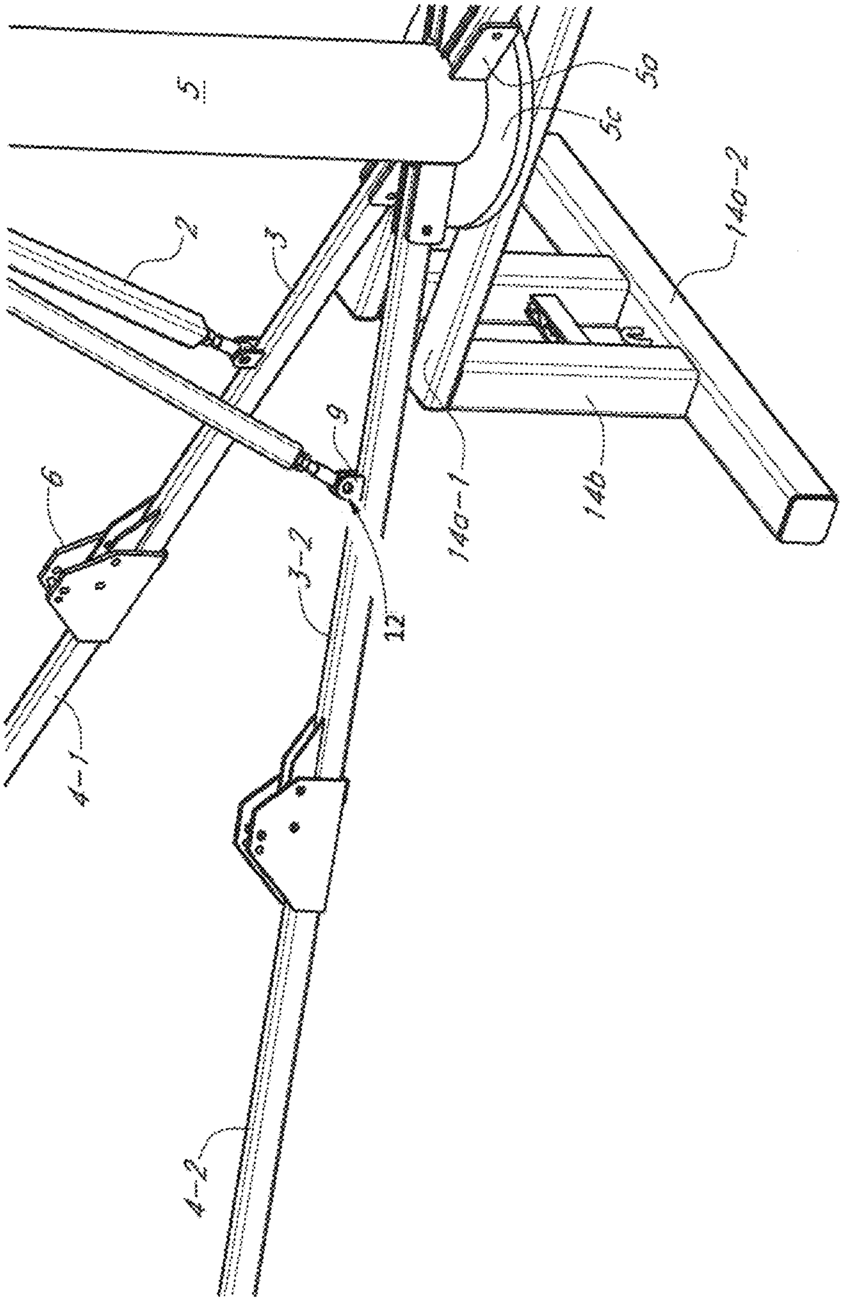
FIG. 6 is detailed perspective view of the joint (pivotable connection) for the attachment of the loading arms to the support arms and the joint for the attachment of the spring tubes and the support arms of the Multi-Armed Lifting Accessory as shown throughout.

FIG. 6 is detailed perspective view of the joint (pivotable connection 6) for the attachment of the loading arm first section 3 to the support arms 2 and the joint 3*b* for the attachment of the spring tubes 1 and the support arms 2 of the Multi-Armed Lifting Accessory 100 as shown throughout.

Figure 7:
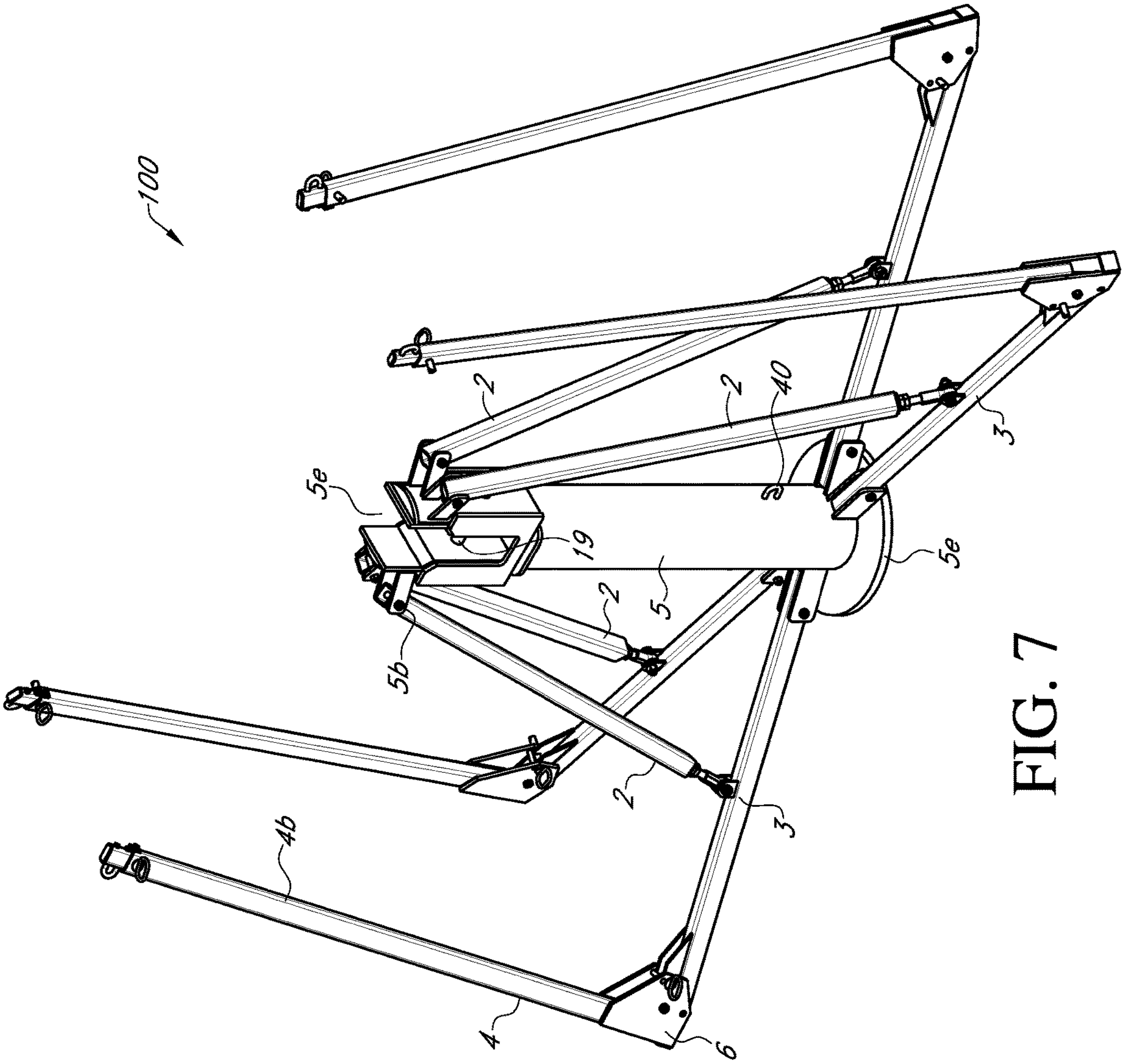
FIG. 7 is a perspective view of a Multi-Armed Lifting Accessory illustrating a low profile embodiment with arms collapsed configured without a base for improved use in confined spaces.
Figure 7A:
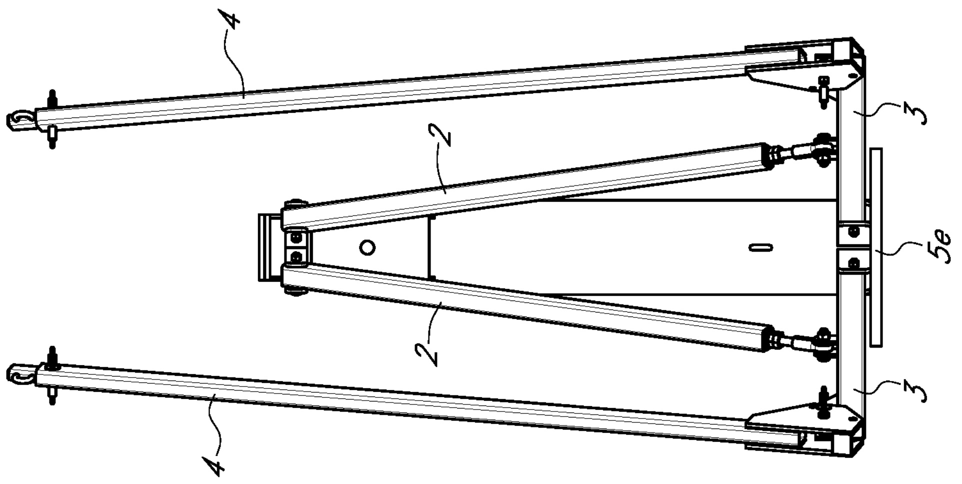
FIG. 7A is an end view of a Multi-Armed Lifting Accessory illustrating a low profile embodiment with arms collapsed.
Figure 7B:
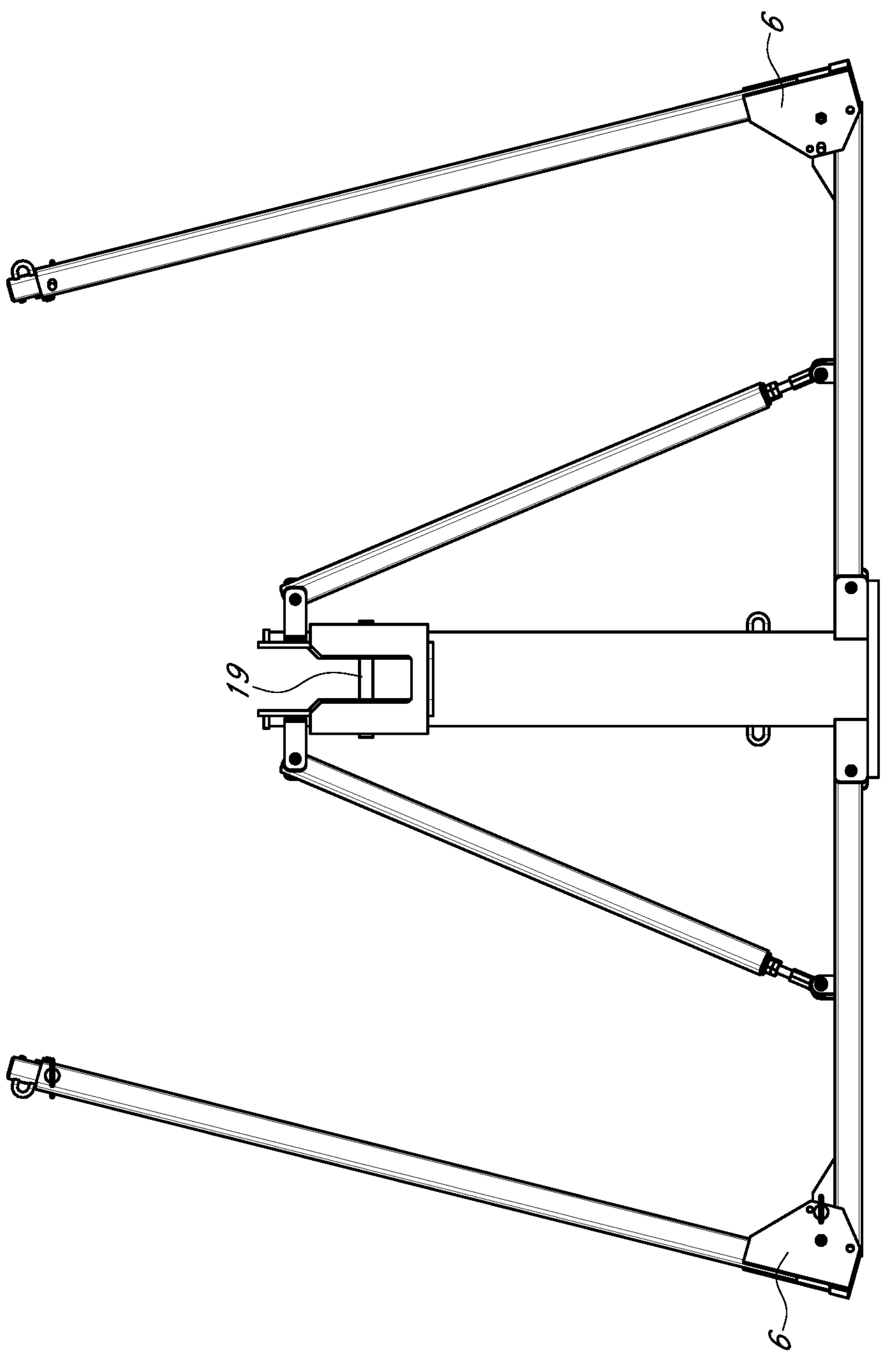
FIG. 7B is a side view Multi-Armed Lifting Accessory illustrating a low profile embodiment with arms collapsed and the upper portion configured as an interior clevis.

FIG. 7 is a perspective view of a Multi-Armed Lifting Accessory 100 illustrating a low profile embodiment with loading arms (3, 4) collapsed configured and without a base 14 for improved use in confined spaces. FIG. 7A is an end view of the Multi-Armed Lifting Accessory 100 embodiment of FIG. 7. FIG. 7B is a side view Multi-Armed Lifting Accessory 100 of FIG. 7. As shown, the upper portion of the lifting body 5 is configured with an interior void 5*e* so that a pin 16 may be positioned therein for engagement with a hook or clevis, not shown but understood by one of ordinary skill in the art. Applicant testing suggests this configuration with an interior void 5*e* improves connection with working devices such as cranes for use with lifting suitable objects. Accordingly, the Multi-Armed Lifting Accessory 100 disclosed at FIGS. 7-10 is intended to be operated the same way as the embodiment disclosed at FIGS. 1-6 so further discussion related to operation is not required.

Figure 8:
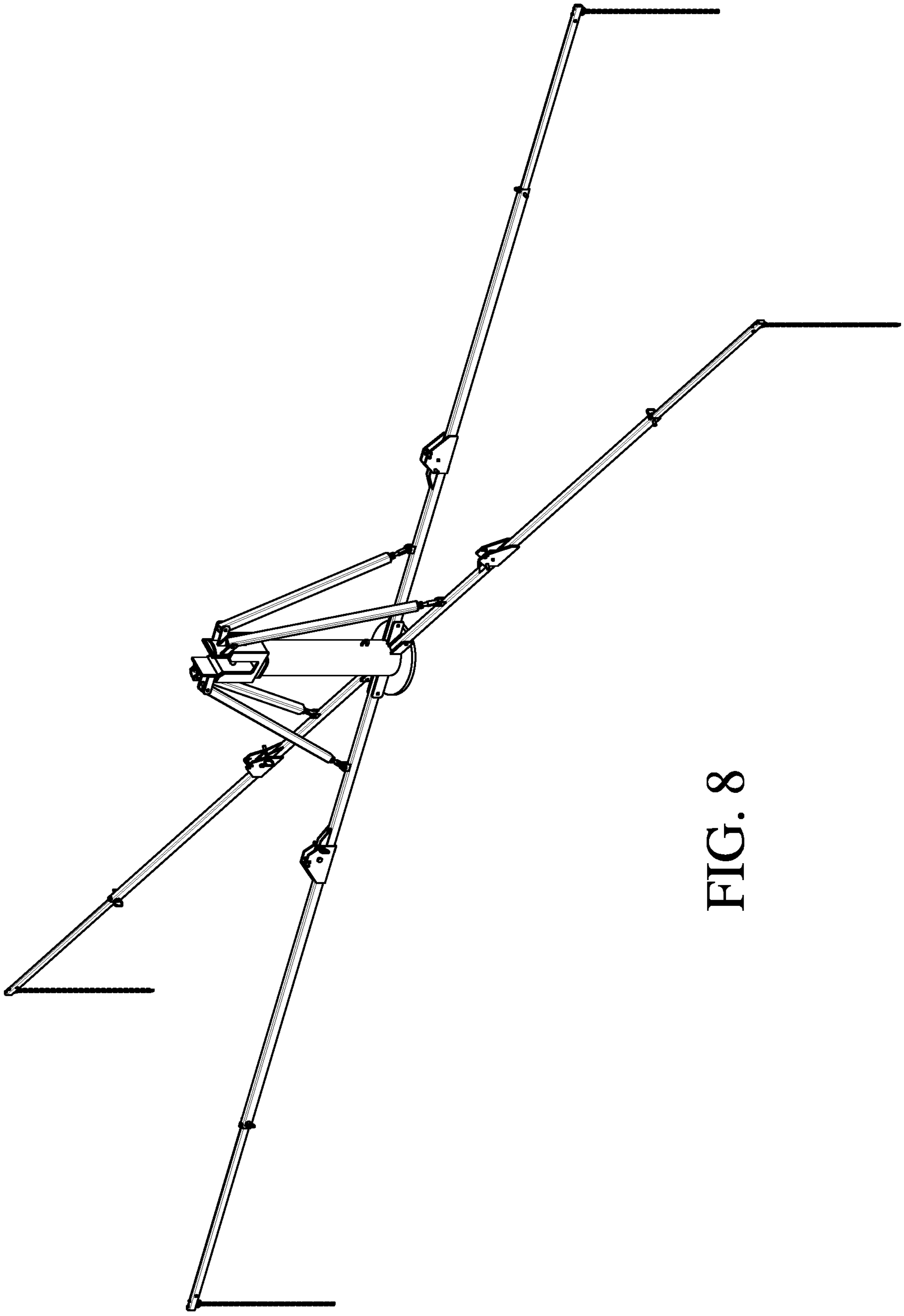
FIG. 8 is a perspective view illustrating a low profile embodiment configured without a base for improved use in confined spaces. As shown, the Mult-armed lifting accessory is configured to allow a hoist or crane to engage with the clevis pin or bar enclosed in the top end of the main body.

FIG. 8 is a perspective view illustrating another low profile embodiment configured without a base for improved use in confined spaces. As shown, the Mult-armed lifting accessory is configured to allow a hoist or crane to engage with the clevis pin 19 or bar enclosed in the top end of the main body 5*e*. As shown, the Mult-armed lifting accessory 100 has the second section of its loading arms (4-1, 4-2, 4-3, 4-4) collapsed. As shown, this embodiment is configured to allow a hoist or crane (not shown) to engage with the clevis pin 19 or bar (not shown but understood) enclosed in the interior void 5*e* located in the upper portion of the main body 5. This configuration lowers the profile (vertical working height) of the Multi-Armed Lifting Accessory 100 because the working end of the lifting device is connected at a lower vertical height than the configurations shown in FIGS. 1-6. Further, the connection point for the lifting device 21 illustrated by pin 15 located within interior void Se is protected by the walls 5*f* also reducing the horizontal profile.

Figure 9A:
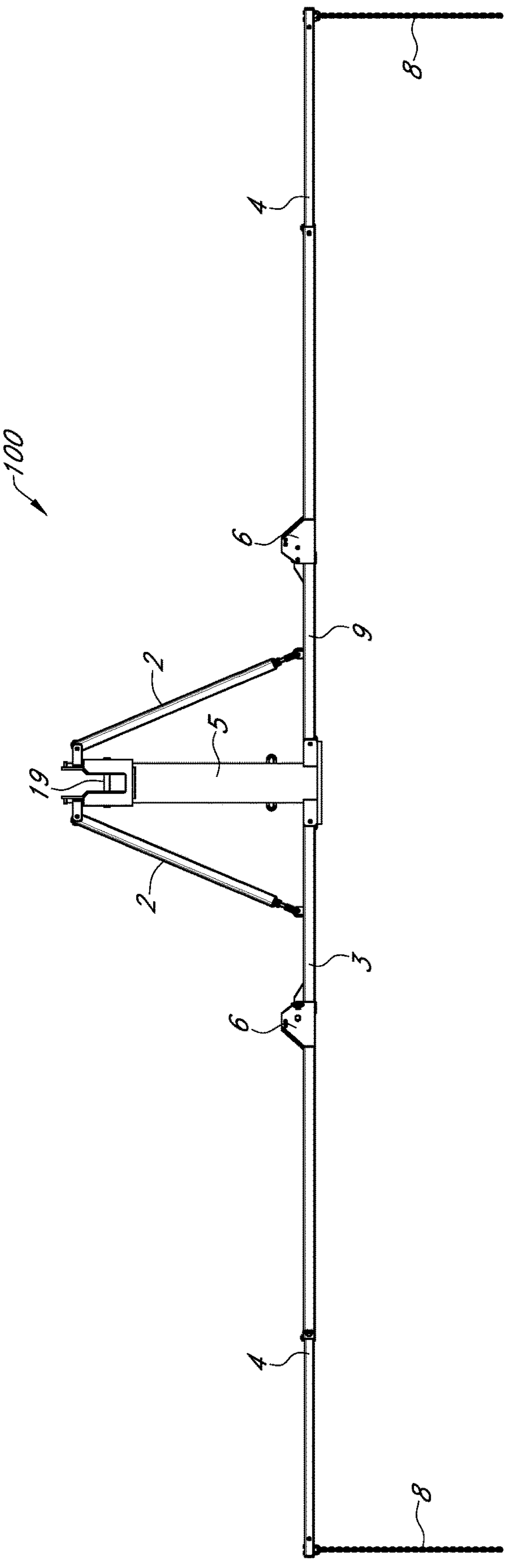
FIG. 9A a front view of the low profile embodiment illustrating the loader arms fully extended.
Figure 9B:
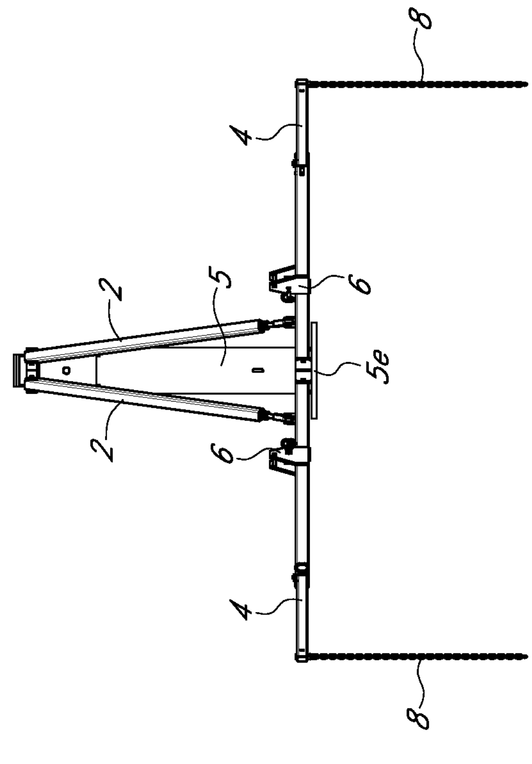
FIG. 9B is a side view of the low profile embodiment of FIGS. 8-9 illustrating the loader arms fully extended with loading chains extended toward the load to be lifted.

FIG. 9A a front view of the low profile embodiment illustrating the loader arms (3,4) fully extended. FIG. 9B is a side view of the low profile embodiment of FIGS. 8-9 illustrating the loader arms fully extended with loading chains 8 extended toward the load to be lifted.

Figure 10:
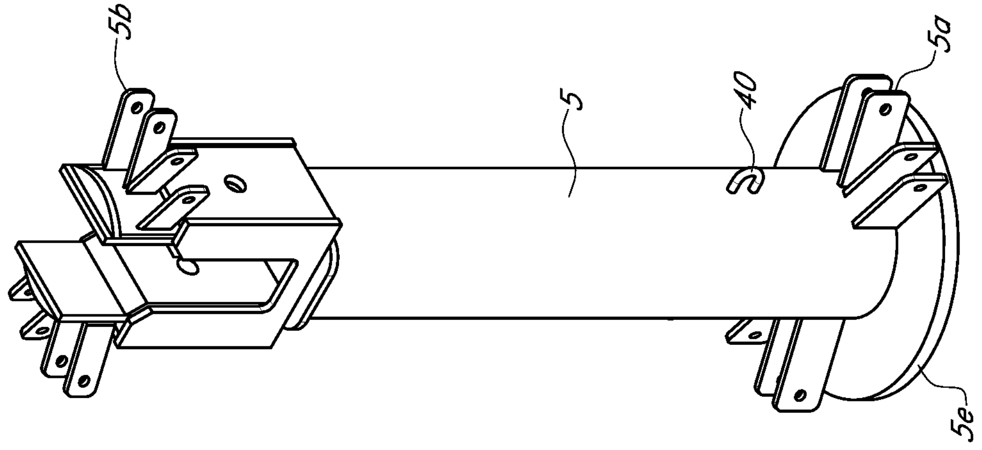
FIG. 10 is a perspective view of the lifter body assembly of the low profile embodiment.
Figure 10A:
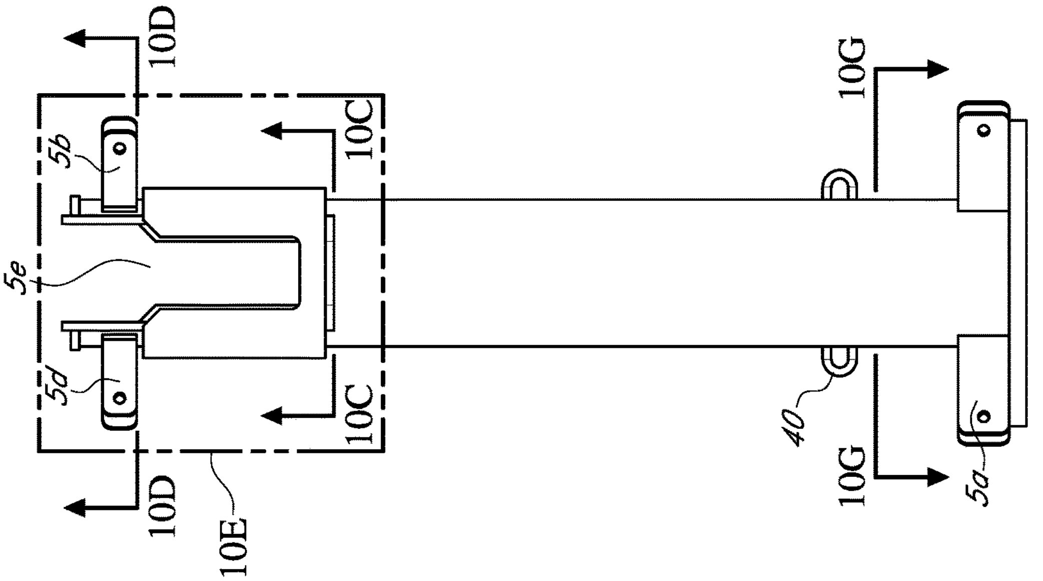
FIG. 10A is a front view of the lifter body assembly of the low profile embodiment of the Multi-Armed Lifting Accessory.
Figure 10B:
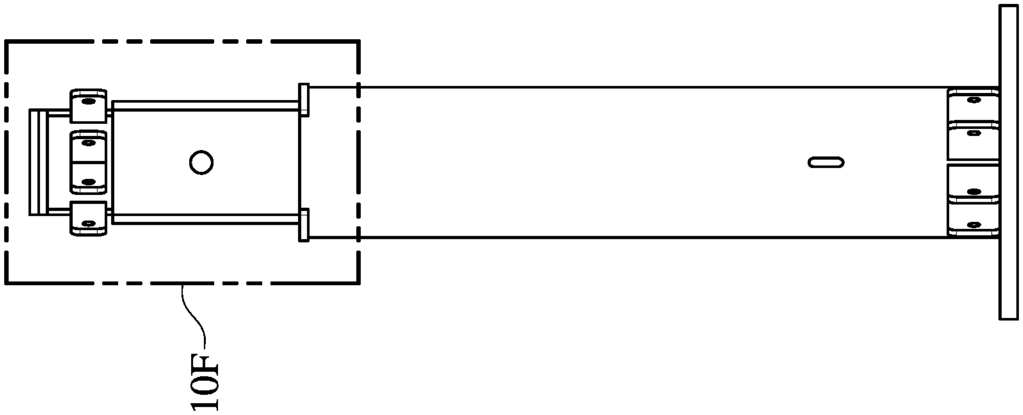
FIG. 10B is a side view of the lifter body assembly of the low profile embodiment the Multi-Armed Lifting Accessory.

FIG. 10 is a perspective view of the lifter body assembly 5 of the low profile embodiment. FIG. 10A is a front view of the lifter body assembly 5 of the low profile embodiment of the Multi-Armed Lifting Accessory 100. FIG. 10B is a side view of the lifter body assembly 5 of the low profile embodiment the Multi-Armed Lifting Accessory 100. FIG. 10C is a sectional view of the middle upper portion of the lifter body assembly of the low profile embodiment of the Multi-Armed Lifting Accessory of FIG. 10A. As shown the recess located in the top.

Figure 10D:
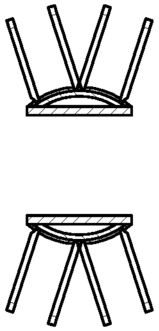
FIG. 10D is a sectional view of the upper portion of the lifter body assembly of the low profile embodiment of the Multi-Armed Lifting Accessory of FIG. 10A. 16
Figure 10C:
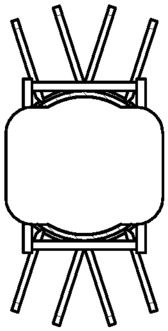
FIG. 10C is a sectional view of the middle upper portion of the lifter body assembly of the low profile embodiment of the Multi-Armed Lifting Accessory of FIG. 10A.

FIG. 10D is a sectional view of the upper portion of the lifter body assembly of the low profile embodiment of the Multi-Armed Lifting Accessory of FIG. 10A.

Figure 10E:
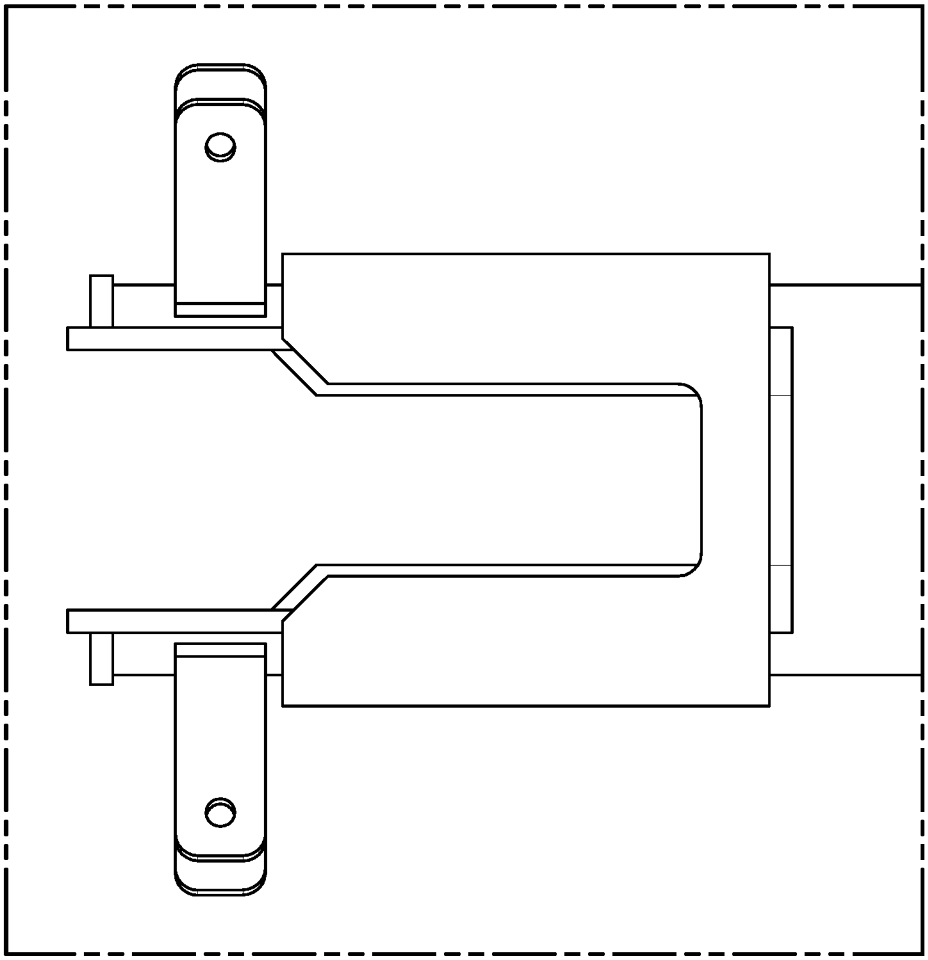
FIG. 10E is a detailed end view of the upper portion of the lifter body assembly of the low profile embodiment of the Multi-Armed Lifting Accessory shown in FIG. 10A.

FIG. 10E is a detailed end view of the upper portion of the lifter body assembly of the low profile embodiment of the Multi-Armed Lifting Accessory shown in FIG. 10A.

Figure 10F:
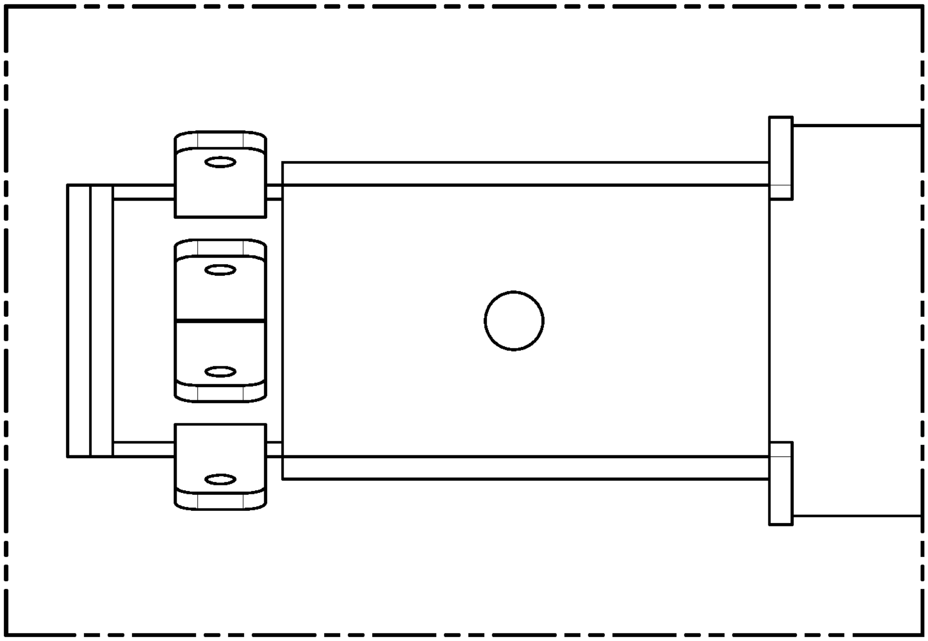
FIG. 10F is a detailed side view of the upper portion of the lifter body assembly of the low profile embodiment of the Multi-Armed Lifting Accessory shown in FIGS. 10B and 10A.

FIG. 10F is a detailed side view of the upper portion of the lifter body assembly of the low profile embodiment of the Multi-Armed Lifting Accessory shown in FIGS. 10B and 10A.

Figure 10G:
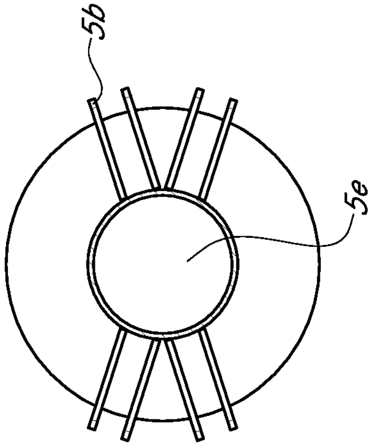
FIG. 10G is a top view of the lower end of the lifter body assembly of FIG. 10A.

FIG. 10G is a top view of the lower end of the lifter body assembly of FIG. 10A.

Figure 11:
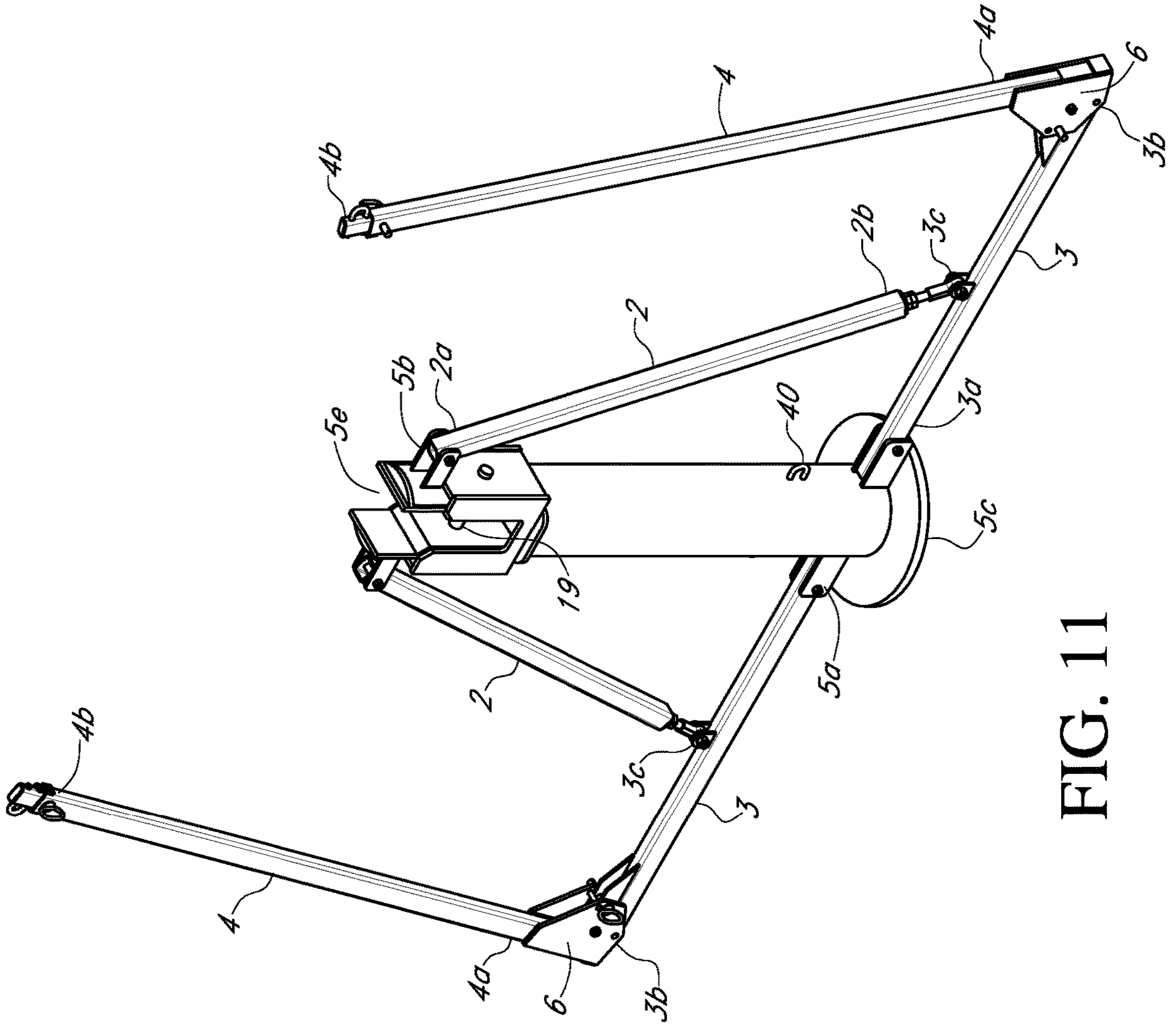
FIG. 11 is a perspective view illustrating a low profile embodiment configured without a base and with only two arms for improved use in confined spaces.
Figure 11A:
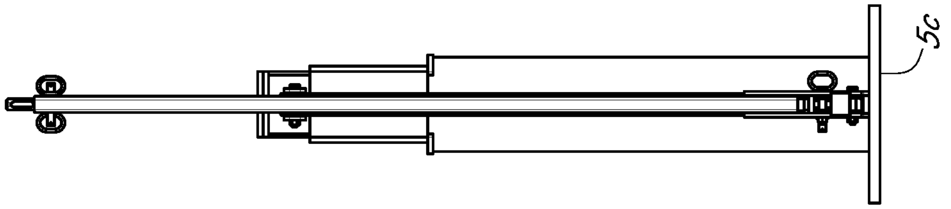
FIG. 11A is a side view illustrating a low profile embodiment configured without a base and with only two arms for improved use in confined spaces.
Figure 11B:
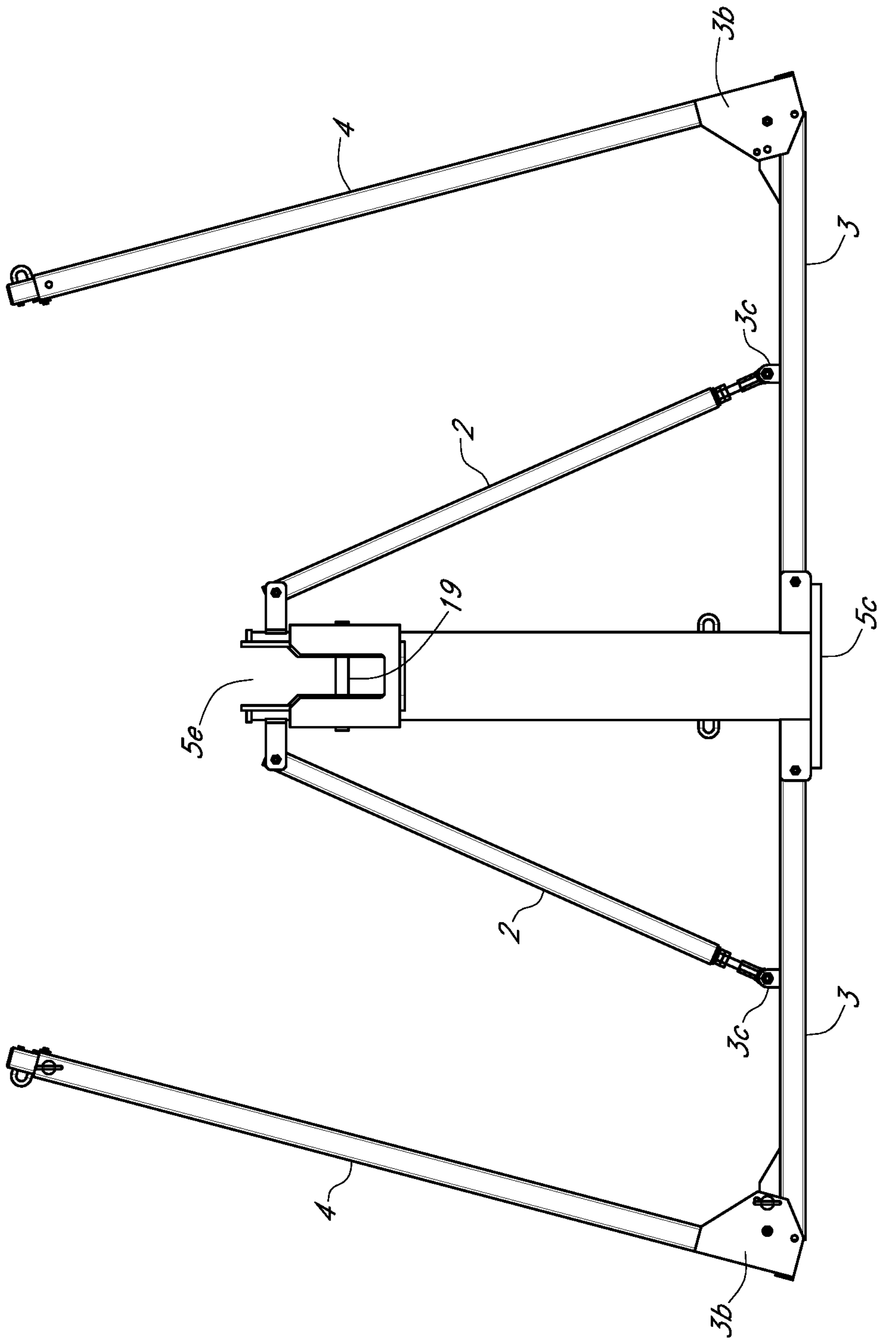
FIG. 11B is a front view illustrating a low profile embodiment configured without a base and with only two arms for improved use in confined spaces.
Figure 12:
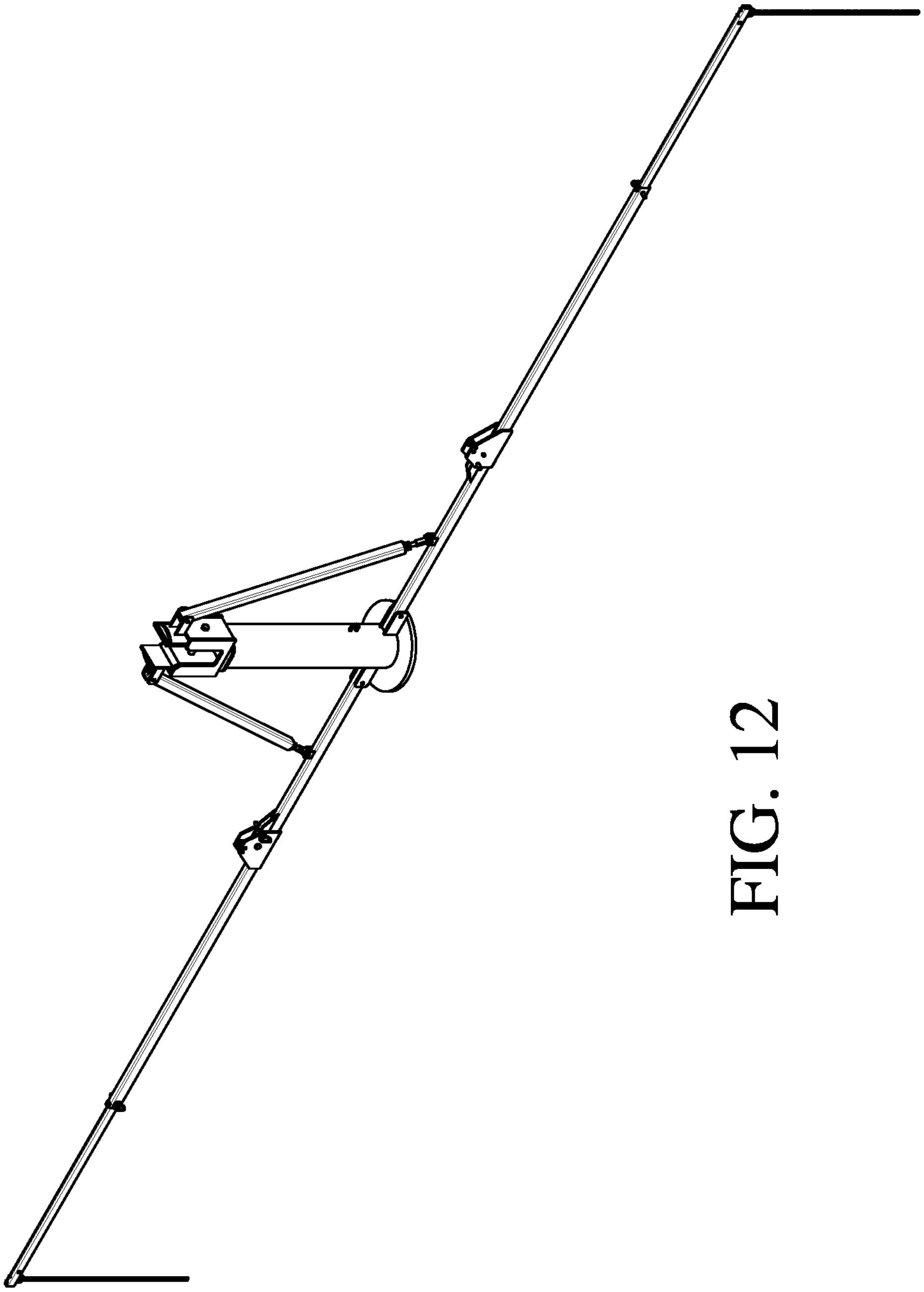
FIG. 12 is a perspective view illustrating a low profile embodiment configured without a base with arms extended with chains as shown at FIGS. 11-11B.
Figure 12A:
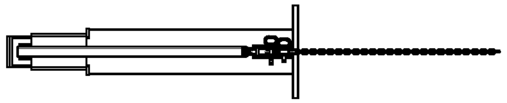
FIG. 12A is a side view illustrating a low profile embodiment configured without a base with arms extended with chains as shown at FIGS. 11-11B.
Figure 12B:
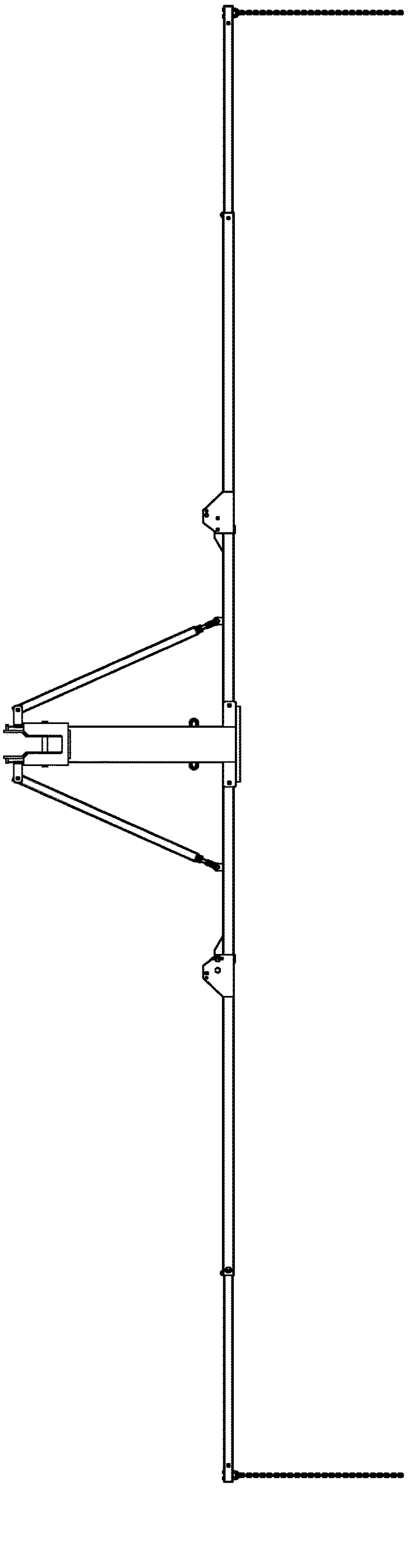
FIG. 12B is a front view illustrating a low profile embodiment configured without a base with arms extended with chains as shown at FIGS. 11-11B.
Figure 13:
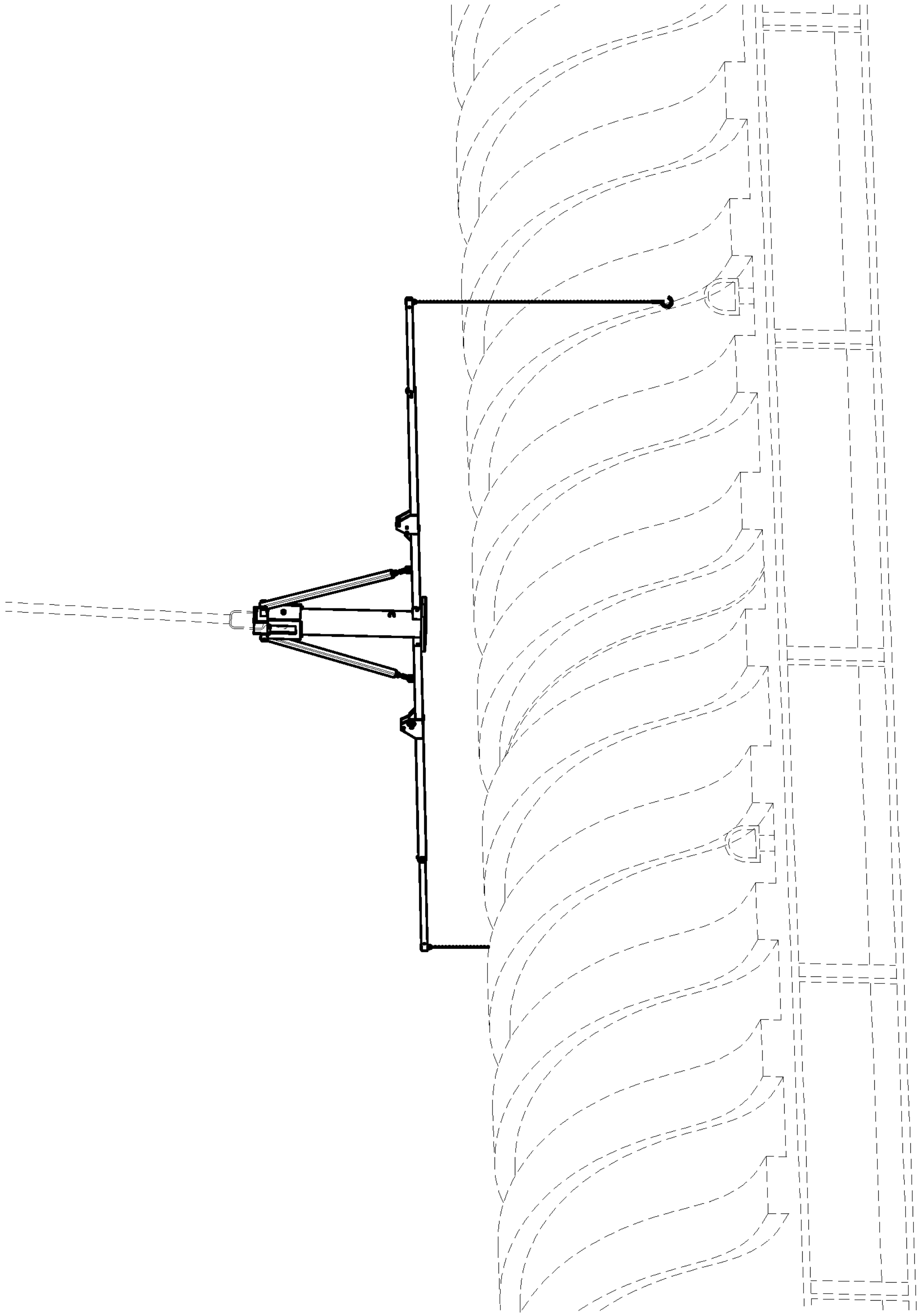
FIG. 13 illustrates the low profile embodiment configured without a base and with only two arms engaged with a barge lid.

FIG. 11 is a perspective view illustrating a low profile embodiment configured without a base 14 with only two arms (3,4) versus the four arms disclosed in FIGS. 1-10 herein. The embodiment at FIG. 11 has been found to allow improved operation in confined spaces, as suitable for loads to be lifted. As shown, the Mult-armed lifting accessory 100 is configured to allow a hoist or crane to engage with the clevis pin or bar 19 enclosed in the head piece configured with the interior void 5*e*. As shown, the Mult-armed lifting accessory 100 is configured to allow a hoist or crane (not shown) to engage with the clevis pin or bar 19, which may be removable, enclosed in the upper portion of the main body which is recessed 5*e*. FIG. 11A is a side view illustrating a low profile embodiment configured without a base and with only two loading arms (3-1, 3-2) for improved use in confined spaces. As will be understood, the embodiment disclosed in FIGS. 11-13 has a similar configuration as the embodiments disclosed at FIGS. 1-6 as related to the support arms (2-1, 2-2) and the loading arms having a first section (3-1, 3-2) and a second section (4-1, 4-2). Accordingly, the Multi-Armed Lifting Accessory 100 disclosed at FIGS. 11-13 is intended to be operated the same way as the embodiment disclosed at FIGS. 1-6 so further discussion is not required. FIG. 11B is a front view illustrating a low profile embodiment configured without a base and with only two arms for improved use in confined spaces. FIG. 12 is a perspective view illustrating a low profile embodiment configured without a base with arms extended with chains as shown at FIGS. 11-11B. FIG. 12A is a side view illustrating a low profile embodiment configured without a base 14 with arms (3,4) extended with chains 13 as shown at FIGS. 11-11B. FIG. 12B is a front view illustrating a low profile embodiment configured without a base with arms (3, 4) extended with chains 13 as shown at FIGS. 11-11B. FIG. 13 illustrates the low profile embodiment configured without a base and with only two arms engaged with a barge lid. As shown, the chains from each arm are intended to be connected to opposite corners of the barge lid. In confined space operation, this configuration has been found to be sufficient to secure the barge lid for either engagement or removal.

It is contemplated that in the illustrative embodiment shown in the enclosed figures the Multi-Armed Lifting Accessory 100 may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density). This particular embodiment of a Multi-Armed Lifting Accessory 100 was fabricated from steel using various laser cutting, welding, securement and machining technologies which are well known to those of ordinary skill in the art. One of ordinary skill will appreciate that the Multi-Armed Lifting Accessory 100 could be constructed by any method known to those in the art including via casting, forging, and machining or stamping and punching, without restriction or limitation. One of ordinary skill will appreciate that the Multi-Armed Lifting Accessory 100 disclosed herein is designed, fabricated and configured to work with any type of bucket which can engage the head of the lifter body 5 and or any type of cable or chain which be engaged with or wrapped around the lifter body 5 as shown but is in no way limited to working only with particular buckets, cables or chains shown herein.

Having described the preferred embodiments, other features of the Multi-Armed Lifting Accessory 100 will undoubtedly occur to those versed in the art, as will numerous modifications and alterations in the embodiments as illustrated herein, all of which may be achieved without departing from the spirit and scope of the Multi-Armed Lifting Accessory 100 disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and access of Multi-Armed Lifting Accessories 100. Furthermore, the methods and embodiments pictured and described herein are no way limiting to the scope of the Multi-Armed Lifting Accessory 100 and method of use unless so stated in the following claims.

It should be noted that the Multi-Armed Lifting Accessory 100 is not limited to the specific embodiments pictured and described herein, but is intended to apply to all similar apparatuses and methods for providing the various benefits and/or features of a Multi-Armed Lifting Accessory 100. Modifications and alterations from the described embodiments will occur to those skilled in the art without departure from the spirit and scope of the Multi-Armed Lifting Accessory 100. It is understood that the Multi-Armed Lifting Accessory 100 as disclosed herein extends to all alternative combinations of one or more of the individual features mentioned, evident from the text and/or drawings, and/or inherently disclosed. All of these different combinations constitute various alternative aspects of the Multi-Armed Lifting Accessory 100 and/or components thereof. The embodiments described herein explain the best modes known for practicing the Multi-Armed Lifting Accessory 100 and/or components thereof and will enable others skilled in the art to utilize the same. The claims are to be construed to include alternative embodiments to the extent permitted by the prior art.

While the Multi-Armed Lifting Accessory 100 has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

The invention claimed is:

1. Multi-Armed Lifting Accessory for use in lifting operations of irregular shaped or balanced loads comprising:

a) a lifter body having an upper end configured with a recess for engagement with a working end of a lifting device;

b) a first loading arm having a first section having a first end and a second end, the first end of the first section of the first loading arm attached to the lifter body, a second section having a first end and a second end, the second end of the first section is connected to the first end of the second section of the first loading arm via a first pivot joint;

c) a first support arm having a first end and a second end, the first end of the first support arm connected to the lifter body proximate the upper end, the second end of the first support arm attached to the first section of the first loading arm between the first end and the second end of the first section of the first loading arm;

d) a second loading arm having a first section having a first end and a second end, the first end of the first section of the second loading arm attached to the lifter body, a second section having a first end and a second end, the second end of the first section is connected to the first end of the second section of the second loading arm via a first pivot joint;

e) a second support arm having a first end and a second end, the first end of the second support arm connected to the lifter body proximate the upper end, the second end of the second support arm attached to the first section of the second loading arm between the first end and the second end of the first section of the second loading arm;

f) a third loading arm having a first section having a first end and a second end, the first end of the first section of the third loading arm attached to the lifter body, a second section having a first end and a second end, the second end of the first section is connected to the first end of the second section of the third loading arm via a first pivot joint;

g) a third support arm having a first end and a second end, the first end of the third support arm connected to the lifter body proximate the upper end, the second end of the third support arm attached to the first section of the third loading arm between the first end and the second end of the first section of the third loading arm;

h) a fourth loading arm having a first section having a first end and a second end, the first end of the first section of the fourth loading arm attached to the lifter body, a second section having a first end and a second end, the second end of the first section is connected to the second section of the fourth loading arm via a first pivot joint;

i) a fourth support arm having a first end and a second end, the first end of the fourth support arm connected to the lifter body proximate the upper end, the second end of the third support arm attached to the first section of the fourth loading arm between the first end and the second end of the first section of the fourth loading arm wherein the first, second, third and fourth support arms are configured with a spring tube to enhance the Multi-Armed Lifting Accessory capacity to flex in response to a shift in the load during a lifting operation.

2. The Multi-Armed Lifting Accessory for use in lifting operations of irregular loads according to claim 1, wherein the first pivot joint allows the first, second, third and fourth loading arms to flex the second end of the second section of the first, second, third and fourth loading arms.

3. The Multi-Armed Lifting Accessory for use in lifting operations of irregular loads according to claim 1, wherein each support arm connects at its first end to the lifter body via a pivotable connection.

4. The Multi-Armed Lifting Accessory for use in lifting operations of irregular loads according to claim 1, wherein each support arm connects at its second end to each loading arm via a pivotable connection.

5. The Multi-Armed Lifting Accessory for use in lifting operations of irregular loads according to claim 1, wherein the upper end of the lifter body configured with the recess is configured with a clevis pin positioned therein for connection of the lifter body to a lifting device.

6. A method for use in lifting operations of irregular shaped or balanced loads comprising:

a) determining a position of irregular shaped or balanced loads;

b) engaging the irregular shaped or balanced loads with a Multi-Armed Lifting Accessory, wherein the Multi-Armed Lifting Accessory further comprises:

i. a lifter body having an upper end configured as a recess with a clevis pin for engagement with the working end of a lifting device;

ii. a first loading arm having a first section having a first end and a second end, the first end of the first section of the first loading arm attached to the lifter body, the second end of the first section of the first loading arm attached to the irregular shaped or balanced loads;

iii. a first support arm having a first end and a second end, the first end of the first support arm connected to the lifter body proximate the upper end, the second end of the first support arm attached to the first section of the first loading arm between the first end and the second end of the first section of the first loading arm;

iv. a second loading arm having a first section having a first end and a second end, the first end of the first section of the second loading arm attached to the lifter body, the second end of the first section of the second loading arm attached to the irregular shaped or balanced loads;

v. a second support arm having a first end and a second end, the first end of the second support arm connected to the lifter body proximate the upper end, the second end of the second support arm attached to the first section of the second loading arm between the first end and the second end of the first section of the second loading arm;

vi. a third loading arm having a first section having a first end and a second end, the first end of the first section of the third loading arm attached to the lifter body, the second end of the first section of the third loading arm attached to the irregular shaped or balanced loads;

vii. a third support arm having a first end and a second end, the first end of the third support arm connected to the lifter body proximate the upper end, the second end of the third support arm attached to the first section of the third loading arm between the first end and the second end of the first section of the third loading arm;

viii. a fourth loading arm having a first section having a first end and a second end, the first end of the first section of the fourth loading arm attached to the lifter body, the second end of the first section of the fourth loading arm attached to the irregular shaped or balanced loads;

ix. a fourth support arm having a first end and a second end, the first end of the fourth support arm connected to the lifter body proximate the upper end, the second end of the third support arm attached to the first section of the fourth loading arm between the first end and the second end of the first section of the fourth loading arm;

c) engaging the working end with a lifting device to secure the Multi-Armed Lifting Accessory to the lifting device;

d) transferring the irregular shaped or balanced loads from a first position to a second position;

e) disengaging the working end to release the lifting device from the Multi-Armed Lifting Accessory.

7. The method for use in lifting operations of irregular shaped or balanced loads according to claim 6, further comprising the step of configuring the Multi-Armed Lifting Accessory such that the location of the connection point on each pair of the support arms to the lifter body and the joint positioned in the loading arm is adjustable to accommodate various positions of the spring tubes.

8. The method for use in lifting operations of irregular shaped or balanced loads according to claim 7, further comprising the step of configuring the Multi-Armed Lifting Accessory such that the spring tubes and the support arms work together in a flexible action in support of the loading arms in response to the irregular shaped or balanced loads.

9. A Multi-Armed Lifting Accessory for use in lifting operations of irregular shaped or balanced loads comprising:

a) a lifter body having an upper end configured as a recess with a clevis pin for engagement with the working end of a lifting device;

b) a first loading arm having a first section having a first end and a second end, the first end of the first section of the first loading arm attached to the lifter body, a second section having a first end and a second end, the second end of the first section is connected to the first end of the second section of the first loading arm via a first pivot joint;

c) a first support arm having a first end and a second end, the first end of the first support arm connected to the lifter body proximate the upper end, the second end of the first support arm attached to the first section of the first loading arm between the first end and the second end of the first section of the first loading arm;

d) a second loading arm having a first section having a first end and a second end, the first end of the first section of the second loading arm attached to the lifter body, a second section having a first end and a second end, the second end of the first section is connected to the first end of the second section of the second loading arm via a first pivot joint; and, e) a second support arm having a first end and a second end, the first end of the second support arm connected to the lifter body proximate the upper end, the second end of the second support arm attached to the first section of the second loading arm between the first end and the second end of the first section of the second loading arm.

10. A Multi-Armed Lifting Accessory for use in lifting operations of irregular shaped or balanced loads according to claim 9, wherein the first pivot joint allows the first and second loading arms to flex the second end of the second section of the first and second loading arms.

11. The Multi-Armed Lifting Accessory for use in lifting operations of irregular loads according to claim 9, wherein the first and second support arms are configured with a spring tube to enhance the capacity of the first and second loading arms to flex in response to a shift in the load during a lifting operation.

12. The Multi-Armed Lifting Accessory for use in lifting operations of irregular loads according to claim 9, wherein each support arm connects at its first end to the lifter body via a pivotable connection.

13. The Multi-Armed Lifting Accessory for use in lifting operations of irregular loads according to claim 9, wherein each support arm connects at its second end to each loading arm via a pivotable connection.

14. The Multi-Armed Lifting Accessory for use in lifting operations of irregular loads according to claim 9, wherein the second end of each loading arm is configured to work with an attachment further defined as being selected from a group consisting of a chain, a cable, a clevis, a pin, a hook or a combination therein.

15. The Multi-Armed Lifting Accessory for use in lifting operations of irregular loads according to claim 9, wherein the lower end of the lifter body connects to a base stand via a shoulder bolt and is configured for independent support of the lifter body.

16. The Multi-Armed Lifting Accessory for use in lifting operations of irregular loads according to claim 9, wherein a top portion of the lifter body is configured as a clevis to work with an attachment further defined as being selected from a group consisting of an excavator, a gator, a crane, a caterpillar, a chain, a cable, a hook or a combination therein.

* * * * *